United States Patent
Mortensen et al.

(10) Patent No.: US 11,905,173 B2
(45) Date of Patent: *Feb. 20, 2024

(54) STEAM REFORMING HEATED BY RESISTANCE HEATING

(71) Applicant: HALDOR TOPSØE A/S, Kgs. Lyngby (DK)

(72) Inventors: Peter Mølgaard Mortensen, Roskilde (DK); Robert Klein, Roskilde (DK); Kim Aasberg-Petersen, Alleroed (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 782 days.

This patent is subject to a terminal disclaimer.

(21) Appl. No.: 17/046,475

(22) PCT Filed: May 15, 2019

(86) PCT No.: PCT/EP2019/062423
§ 371 (c)(1),
(2) Date: Oct. 9, 2020

(87) PCT Pub. No.: WO2019/228797
PCT Pub. Date: Dec. 5, 2019

(65) Prior Publication Data
US 2021/0171344 A1    Jun. 10, 2021

(30) Foreign Application Priority Data
May 31, 2018    (EP) .................................... 18175366

(51) Int. Cl.
*C01B 3/38*    (2006.01)
*B01J 15/00*    (2006.01)
(Continued)

(52) U.S. Cl.
CPC ............. *C01B 3/384* (2013.01); *B01J 15/005* (2013.01); *B01J 19/2485* (2013.01); *C01B 3/40* (2013.01);
(Continued)

(58) Field of Classification Search
CPC . B01J 15/00; B01J 15/005; B01J 19/00; B01J 19/24; B01J 19/248; B01J 19/2485;
(Continued)

(56) References Cited

U.S. PATENT DOCUMENTS 3,499,947 A   3/1970 Johnson
4,157,356 A   6/1979 Bulford et al.
(Continued)

FOREIGN PATENT DOCUMENTS

CA    2427464 A1    4/1999
CN    1483133 A    3/2004
(Continued)

OTHER PUBLICATIONS

Aasberg-Petersen, K., et al., "Synthesis gas production for FT synthesis," Studies in Surface Science and Catalysis, vol. 152, Chapter 4, 2004, p. 258-405, Elsevier B.V., The Netherlands.
(Continued)

*Primary Examiner* — Natasha E Young
(74) *Attorney, Agent, or Firm* — Boone IP Law

(57) ABSTRACT

A reactor system for carrying out steam reforming of a feed gas comprising hydrocarbons, including: a structured catalyst arranged for catalyzing steam reforming of a feed gas including hydrocarbons, the structured catalyst including a macroscopic structure of electrically conductive material, the macroscopic structure supporting a ceramic coating, wherein the ceramic coating supports a catalytically active material; a pressure shell housing the structured catalyst; heat insulation layer between the structured catalyst and the
(Continued)

pressure shell; at least two conductors electrically connected to the macroscopic structure and to an electrical power supply placed outside the pressure shell, wherein the electrical power supply is dimensioned to heat at least part of the structured catalyst to a temperature of at least 500° C. by passing an electrical current through the macroscopic structure. Also, a process for steam reforming of a feed gas comprising hydrocarbons.

28 Claims, 15 Drawing Sheets

(51) Int. Cl.
  *B01J 19/24* (2006.01)
  *C01B 3/40* (2006.01)
(52) U.S. Cl.
  CPC ............ *B01J 2219/00135* (2013.01); *B01J 2219/00155* (2013.01); *B01J 2219/243* (2013.01); *B01J 2219/2416* (2013.01); *B01J 2219/2428* (2013.01); *B01J 2219/2438* (2013.01); *C01B 2203/0233* (2013.01); *C01B 2203/085* (2013.01); *C01B 2203/0883* (2013.01); *C01B 2203/1023* (2013.01); *C01B 2203/1264* (2013.01)
(58) Field of Classification Search
  CPC .......... B01J 2219/00; B01J 2219/00008; B01J 2219/00017; B01J 2219/000389; B01J 2219/00049; B01J 2219/00051; B01J 2219/00132; B01J 2219/00135; B01J 2219/0015; B01J 2219/00155; B01J 2219/24; B01J 2219/2401; B01J 2219/2402; B01J 2219/2409; B01J 2219/2416; B01J 2219/2425; B01J 2219/2427; B01J 2219/2428; B01J 2219/243; B01J 2219/2433; B01J 2219/2438; C01B 3/00; C01B 3/02; C01B 3/32; C01B 3/34; C01B 3/38; C01B 3/384; C01B 3/40; C01B 2203/00; C01B 2203/02; C01B 2203/0205; C01B 2203/0227; C01B 2203/0233; C01B 2203/08; C01B 2203/0805; C01B 2203/085; C01B 2203/0872; C01B 2203/0883; C01B 2203/10; C01B 2203/1005; C01B 2203/1023; C01B 2203/1041; C01B 2203/1047; C01B 2203/1052; C01B 2203/1058; C01B 2203/12; C01B 2203/1258; C01B 2203/1264; C01B 2203/14; C01B 2203/141
  See application file for complete search history.

(56) References Cited

U.S. PATENT DOCUMENTS

| | | | |
|---|---|---|---|
| 5,631,302 A | 5/1997 | Koenig et al. | |
| 5,827,901 A | 10/1998 | Koenig et al. | |
| 5,976,723 A | 11/1999 | Boffito et al. | |
| 6,322,757 B1 | 11/2001 | Cohn et al. | |
| 6,433,029 B1 | 8/2002 | Fitzpatrick | |
| 6,746,650 B1 | 6/2004 | Lesieur | |
| 7,960,441 B2 | 6/2011 | Wolf | |
| 8,568,581 B2 | 10/2013 | Sivasankar et al. | |
| 9,067,847 B2* | 6/2015 | Bashir ............... C10K 1/005 | |
| 11,214,488 B2 | 1/2022 | Rueger | |
| 2002/0051741 A1 | 5/2002 | Abe et al. | |
| 2002/0081253 A1 | 6/2002 | Abe | |
| 2002/0094312 A1 | 7/2002 | Hanus et al. | |
| 2002/0119084 A1* | 8/2002 | Boneberg ............... C01B 3/38 422/600 |
| 2004/0016650 A1 | 1/2004 | Klug | |
| 2004/0081875 A1 | 4/2004 | Milliken et al. | |
| 2004/0197246 A1 | 10/2004 | Stevens et al. | |
| 2004/0265225 A1 | 12/2004 | Watson et al. | |
| 2006/0116543 A1 | 6/2006 | Bellet et al. | |
| 2006/0124445 A1 | 6/2006 | Labrecque et al. | |
| 2006/0254141 A1 | 11/2006 | Krause et al. | |
| 2007/0045125 A1 | 3/2007 | Hartvigsen et al. | |
| 2008/0023338 A1 | 1/2008 | Stoots et al. | |
| 2008/0169449 A1 | 7/2008 | Mundschau | |
| 2009/0235587 A1 | 9/2009 | Hawkes et al. | |
| 2009/0289227 A1 | 11/2009 | Rising | |
| 2009/0307975 A1 | 12/2009 | Wolf | |
| 2010/0111781 A1 | 5/2010 | Takahashi et al. | |
| 2010/0296984 A1 | 11/2010 | Ando et al. | |
| 2011/0020207 A1 | 1/2011 | Siegert | |
| 2011/0136027 A1 | 6/2011 | Chen et al. | |
| 2011/0253550 A1 | 10/2011 | Hoffmann | |
| 2011/0253551 A1 | 10/2011 | Lane et al. | |
| 2011/0293510 A1 | 12/2011 | Grannell et al. | |
| 2012/0228150 A1 | 9/2012 | Kang et al. | |
| 2012/0288776 A1 | 11/2012 | Nagaosa | |
| 2012/0326090 A1 | 12/2012 | Han et al. | |
| 2013/0345326 A1 | 12/2013 | Bashir et al. | |
| 2014/0272734 A1 | 9/2014 | Braun et al. | |
| 2014/0291162 A1 | 10/2014 | Sala et al. | |
| 2015/0129805 A1 | 5/2015 | Karpenko et al. | |
| 2015/0175509 A1 | 6/2015 | Almqvist et al. | |
| 2015/0299871 A1 | 10/2015 | Chen et al. | |
| 2016/0002036 A1 | 1/2016 | Kolaczkowski et al. | |
| 2016/0355932 A1 | 12/2016 | Reytier et al. | |
| 2017/0106360 A1 | 4/2017 | Meriam | |
| 2018/0066371 A1 | 3/2018 | Hong et al. | |
| 2018/0127668 A1 | 5/2018 | Masel | |
| 2018/0194632 A1 | 7/2018 | Jakobsson et al. | |
| 2019/0085250 A1 | 3/2019 | Anzelmo et al. | |
| 2019/0112187 A1 | 4/2019 | Østeberg et al. | |
| 2019/0144376 A1 | 5/2019 | Højlund et al. | |
| 2020/0095124 A1 | 3/2020 | Rueger | |
| 2020/0354216 A1 | 11/2020 | Mortensen | |
| 2021/0113983 A1 | 4/2021 | Mortensen et al. | |
| 2021/0238035 A1 | 8/2021 | Mortensen et al. | |
| 2022/0081289 A1 | 3/2022 | De Sarkar et al. | |

FOREIGN PATENT DOCUMENTS

| | | |
|---|---|---|
| CN | 101177239 A | 5/2008 |
| CN | 105188903 A | 12/2015 |
| DE | 102005046746 A1 | 4/2007 |
| DE | 102013102969 A1 | 9/2014 |
| DE | 102013226126 A1 | 6/2015 |
| EP | 0025205 A1 | 3/1981 |
| EP | 2491998 A1 | 8/2012 |
| EP | 2955158 A1 | 12/2015 |
| EP | 3249027 A1 | 11/2017 |
| EP | 2874738 B1 | 9/2018 |
| EP | 3415661 A1 | 12/2018 |
| EP | 3472370 A1 | 4/2019 |
| EP | 3574991 A1 | 12/2019 |
| GB | 0722025 A | 1/1955 |
| GB | 0915444 A | 1/1963 |
| GB | 1269311 A | 4/1972 |
| GB | 1338352 A | 11/1973 |
| GB | 2358148 A | 7/2001 |
| JP | H5-6120 U | 1/1993 |
| JP | 2008001584 A | 1/2008 |
| JP | 2014-152219 A | 8/2014 |
| KR | 10-2009-0068427 A | 6/2009 |
| KR | 10-2018-0075285 A | 7/2018 |
| WO | 0076651 A1 | 12/2000 |
| WO | 2004091773 A1 | 10/2004 |
| WO | 2007/048641 A2 | 5/2007 |
| WO | 2007/088923 A1 | 8/2007 |
| WO | 2010/004300 A1 | 1/2010 |
| WO | 2012/084609 A1 | 6/2012 |
| WO | 2013/131778 A2 | 9/2013 |

(56) References Cited

FOREIGN PATENT DOCUMENTS

| | | |
|---|---|---|
| WO | 2014/099567 A1 | 6/2014 |
| WO | 2014/154253 A1 | 10/2014 |
| WO | 2014/180888 A1 | 11/2014 |
| WO | 2015/014527 A1 | 2/2015 |
| WO | 2016/091636 A1 | 6/2016 |
| WO | 2017/014635 A1 | 1/2017 |
| WO | 2017036794 A1 | 3/2017 |
| WO | 2017/186612 A1 | 11/2017 |
| WO | 2017/186615 A1 | 11/2017 |
| WO | 2018/206235 A1 | 11/2018 |
| WO | 2018/228723 A1 | 12/2018 |
| WO | 2019/104375 A1 | 6/2019 |
| WO | 2019/110266 A1 | 6/2019 |
| WO | 2019/110267 A1 | 6/2019 |
| WO | 2019/110268 A1 | 6/2019 |
| WO | 2019/228796 A1 | 12/2019 |
| WO | 2019/228797 A1 | 12/2019 |
| WO | 2019/228798 A1 | 12/2019 |
| WO | 2020/008008 A1 | 1/2020 |
| WO | 2020/035574 A1 | 2/2020 |
| WO | 2020/208008 A1 | 10/2020 |

OTHER PUBLICATIONS

Boccuzzi et al., "FTIR study of methanol decomposition on gold catalyst for fuel Cells", Journal of Power Sources, vol. 118, No. 1-2, May 25, 2003, pp. 304-310.
Danish Search Report dated Mar. 27, 2020 issued by the Danish Patent and Trademark Office in Danish Patent Application No. PA 201901437. (9 pages).
Danish Search Report for Danish Application No. PA 2019 01145 dated Mar. 12, 2020 (7 pages).
Danish Search Report for Danish Application No. PA 2019 01432 dated Mar. 27, 2020 (10 pages).
Danish Search Report issued in corresponding Patent Application No. PA 2019 01434 dated May 27, 2020 (8 pages).
International Preliminary Report on Patentability received for PCT Patent Application No. PCT/EP2019/062423, dated Dec. 10, 2020, 8 pages.
International Preliminary Report on Patentability received for PCT Patent Application No. PCT/EP2019/062424, dated Dec. 10, 2020, 8 pages.
International Search Report and Written Opinion received for PCT Patent Application No. PCT/EP2019/062424, dated Jul. 26, 2019, 11 pages.
International Search Report and Written Opinion received for PCT Patent Application No. PCT/EP2020/076695, dated Nov. 23, 2020, 11 pages.
International Search Report and Written Opinion received for PCT Patent Application No. PCT/EP2020/076698, dated Nov. 26, 2020, 9 pages.
International Search Report and Written Opinion received for PCT Patent Application No. PCT/EP2020/076700, dated Nov. 26, 2020, 11 pages.
International Search Report and Written Opinion received for PCT Patent Application No. PCT/EP2020/076704, dated Nov. 26, 2020, 11 pages.
International Search Report and Written Opinion received for PCT Patent Application No. PCT/EP2020/076707, dated Nov. 27, 2020, 11 pages.
International Search Report and Written Opinion received for PCT Patent Application No. PCT/EP2020/076713, dated Nov. 26, 2020, 11 pages.
Search Report dated Apr. 24, 2020, issued in the Danish Patent Application No. PA201901433, 9 pages.
Search Report dated Apr. 24, 2020, issued in the Danish Patent Application No. PA201901435, 9 pages.
Search Report dated Jan. 28, 2019, issued in the Danish Patent Application No. PA201800249, 9 pages.
Wismann, Sebastian T., et al., "Electrified methane reforming: A compact approach to greener industrial hydrogen production," Science, May 24, 2019, p. 756-759, vol. 364, American Association for the Advancement of Science, Washington, D.C.
Xu et al., "Methane Steam Reforming, Methanation and Water-Gas Shift: I. Intrinsic Kinetics", American Institution of Chemical Engineers Journal, vol. 35, No. 1, Jan. 1989, pp. 88-96.
Zhou et al. "Investigation of a novel porous anodic alumina plate for methane steam reforming: Hydrothermal stability, electrical heating possibility and reforming reactivity", International Journal of Hydrogen Energy, vol. 34, No. 2, Jan. 1, 2009, p. 844-858, Elsevier Ltd., UK.
Office Action (Notice of Reasons for Refusal) dated Apr. 18, 2023, by the Japanese Patent Office in corresponding Japanese Patent Application No. 2020-566667, and an English Translation of the Office Action. (8 pages).
European Search Report dated Jul. 11, 2018, by the European Patent Office for European Application No. 18175366.6.
International Search Report (PCT/ISA/210) dated Aug. 26, 2019, by the European Patent Office as the International Searching Authority for International Application No. PCT/EP2019/062423.
Written Opinion (PCT/ISA/237) dated Aug. 26, 2019, by the European Patent Office as the International Searching Authority for International Application No. PCT/EP2019/062423.
Danish Search Report issued in corresponding Patent Application No. PA 2019 01324 dated May 27, 2020, 8 pages.
International Search Report (PCT/ISA/210) and Written Opinion (PCT/ISA/237) dated Feb. 23, 2021, by the European Patent Office as the International Searching Authority for International Application No. PCT/EP2020/081700. (20 Pages).
Keim, W., "Synthesis Gas Feedstock for Chemicals", American Chemical Society, Jan. 1, 1987, vol. 25, No. 10, pp. 1-16. (16 pages).
Kongas, Rainer, "Review-Electrochemical CO2 Reduction for CO Production: Comparison of Low- and High-Temperature Electrolysis Technologies", Journal of the Electrochemical Society, Feb. 14, 2020, 167:0044508. (12 pages).
Wang, Y., et al., "High temperature solid oxide H2O/Co2 co-electrolysis for syngas production", Fuel Processing Technology, Nov. 14, 2016, vol. 161, pp. 248-258. (12 pages).

\* cited by examiner

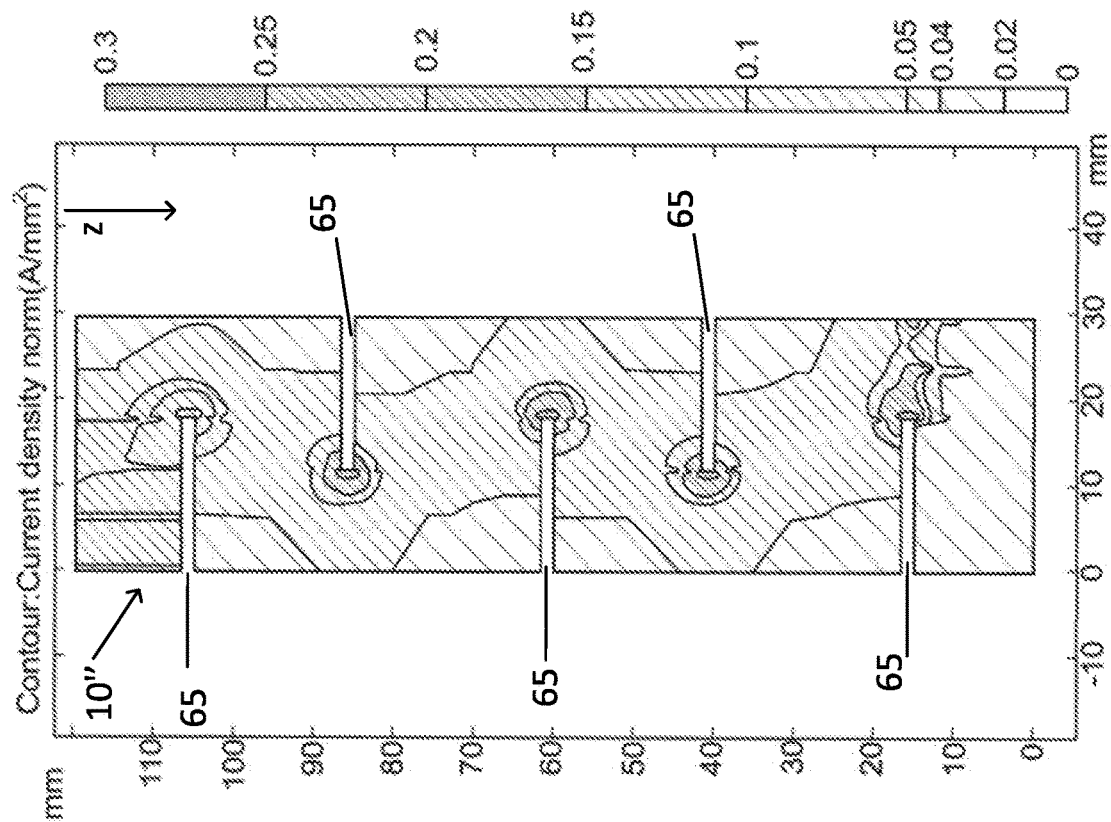
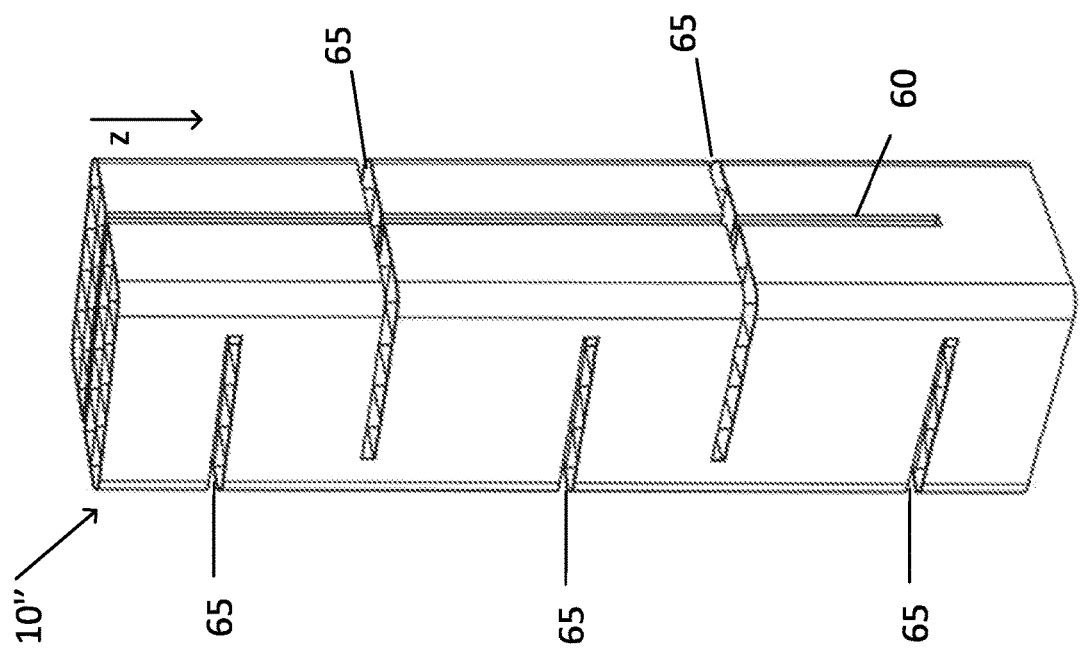
Fig. 9b
Fig. 9a even up to 1300° C., and if
STEAM REFORMING HEATED BY RESISTANCE HEATING The present application is a national phase entry under 35 U.S.C. § 371 of International Application No. PCT/EP2019/06423, now WO 2019/228797, filed on May 15, 2019, which claims priority to European Patent Application No. EP18175366.6, filed on May 31, 2018, the disclosures of which are hereby incorporated herein by reference.

FIELD OF THE INVENTION

Embodiments of the invention relate to a reactor system and a process for carrying out steam reforming of a feed gas comprising hydrocarbons where the heat for the endothermic reaction is provided by resistance heating.

BACKGROUND

Steam reforming reactions will often be challenged by how efficient heat can be transferred to the reactive zone of the catalyst bed within a reactor unit. Conventional heat transfer by convection, conduction, and/or radiation heating can be slow and will often meet large resistance in many configurations. This challenge can be illustrated with the tubular reformer in a steam reforming plant, which practically can be considered as a large heat exchanger with heat transfer as the rate limiting step. The temperature at the innermost part of the tubes of the tubular reformer is somewhat lower than the temperature outside the tubes due to the heat transfer rate through the walls of the tube and to the catalyst within the tubes as well as due to the endothermic nature of the steam reforming reaction.

One way to supply heat within catalyst instead of outside the tubes housing the catalyst is by means of electrical resistance heating. DE102013226126 describes a process for allothermal methane reforming with physical energy reclamation, wherein methane is reformed by means of carbon dioxide to synthesis gas consisting of carbon monoxide and hydrogen. The starting gases $CH_4$ and $CO_2$ are conducted in a fixed bed reactor consisting of electrically conductive and catalytic particles, which is electrically heated to temperatures of about 1000 K. The conversion of the reactant gases and the generation of heat of the generated synthesis gas take place in the fixed bed reactor.

It is an object of the invention to provide an alternative configuration of an electrically heated reactor system for carrying out steam reforming.

It is also an object of the invention to provide a reactor system with integrated heat supply and catalysts.

It is a further object of the invention to provide a reactor system and process for producing synthesis gas by steam reforming wherein the overall energy consumption is reduced compared to a system with an externally heated reactor, such as a side fired or top fired steam methane reformer (SMR), which is the reference for industrial scale steam reforming. By utilizing electric heating, the high temperature flue gas of the fired SMR is avoided and less energy is therefore needed in the reforming section of the electrically heated reactor.

It is another object of the invention to provide a reactor system and process for producing synthesis gas by steam reforming wherein the amount of catalyst and the size of the reactor system is reduced compared to an SMR. Moreover, the invention provides for the possibility of tailoring and thus reducing the amount of catalytically active material, while having a controlled reaction front of the reforming reaction.

It is also an object of the invention to provide a reactor system and process for producing synthesis gas by steam reforming where the amount of synthesis gas produced in a single pressure shell is increased considerably compared to known tubular steam reformers.

It is furthermore an object of the invention to provide a process for production of a synthesis gas by use of a steam reforming reactor system, wherein the synthesis gas output from the steam reforming reactor system has a relatively high temperature and a relatively high pressure. In particular, it is desirable if the temperature of the synthesis gas output from the steam reforming reactor system is between about 900° C. and 1100° C. or even up to 1300° C., and if the pressure of the synthesis gas output from the steam reforming reactor system is between about 30 bar and about 100 bar. The invention will allow for precise control of the temperature of the synthesis gas output from the steam reforming reactor system.

An advantage of the invention is that the overall emission of carbon dioxide and other emissions detrimental to the climate may be reduced considerably, in particular if the power used in the reactor system is from renewable energy resources.

SUMMARY OF THE INVENTION

Embodiments of the invention generally relate to a reactor system for carrying out steam reforming of a feed gas comprising hydrocarbons, the reactor system comprising:
- a structured catalyst arranged for catalyzing steam reforming of a feed gas comprising hydrocarbons, the structured catalyst comprising a macroscopic structure of electrically conductive material, the macroscopic structure supporting a ceramic coating, wherein the ceramic coating supports a catalytically active material, where the pressure shell comprises an inlet for letting in the feed gas and an outlet for letting out product gas, wherein the inlet is positioned so that the feed gas enters the structured catalyst in a first end of the structured catalyst and the product gas exits the structured catalyst from a second end of the structured catalyst;
- a pressure shell housing the structured catalyst;
- heat insulation layer between the structured catalyst and the pressure shell;
- at least two conductors electrically connected to the structured catalyst and to an electrical power supply positioned outside the pressure shell, wherein the electrical power supply is dimensioned to heat at least part of the structured catalyst to a temperature of at least 500° C. by passing an electrical current through the structured catalyst, wherein the at least two conductors are connected to the structured catalyst at a position on the structured catalyst closer to the first end of the structured catalyst than to the second end of the structured catalyst, and wherein the structured catalyst is constructed to direct an electrical current to run from one conductor substantially to the second end of the structured catalyst and return to a second of the at least two conductors.

The layout of the reactor system allows for feeding a pressurized feed gas to the reactor system at an inlet and directing this gas into the pressure shell of the reactor system. Inside the pressure shell, a configuration of heat insulation layers and inert material is arranged to direct the feed gas through the channels of the structured catalyst where it will be in contact with the ceramic coating and the catalytically active material supported on the ceramic coatings, where the catalytically active material will facilitate the steam reforming reaction. Additionally, the heating of the structured catalyst will supply the required heat for the endothermic reaction. The product gas from the structured catalyst is led to the reactor system outlet.

The term "first end of the structured catalyst" is meant to denote the end of the structured catalyst where the feed gas enters the structured catalyst, and the term "second end of the structured catalyst" is meant to denote the end of the structured catalyst from which the gas exits the structured catalyst. Moreover, it should be noted that the term "the at least two conductors are connected to the structured catalyst at a position on the structured catalyst closer to the first end of the structured catalyst than to the second end of the structured catalyst" is meant to denote that both/all of the at least two conductors are connected closer to the first end of the structured catalyst than to the second end. Preferably, the at least two conductors are connected to first end of the structured catalyst or within the quarter of the length of the/a macroscopic structure closest to the first end.

The close proximity between the catalytically active material and the macroscopic structures enables efficient heating of the catalytically active material by solid material heat conduction from the resistance heated macroscopic structure. An important feature of the resistance heating process is thus that the energy is supplied inside the object itself, instead of being supplied from an external heat source via heat conduction, convection and radiation. Moreover, the hottest part of the reactor system will be within the pressure shell of the reactor system. Preferably, the electrical power supply and the structured catalyst are dimensioned so that at least part of the structured catalyst reaches a temperature of 850° C., preferably 900° C., more preferably 1000° C. or even more preferably 1100° C. The amount and composition of the catalytically active material can be tailored to the steam reforming reaction at the given operating conditions. The surface area of the macroscopic structure, the fraction of the macroscopic structure coated with a ceramic coating, the type and structure of the ceramic coating, and the amount and composition of the catalytically active catalyst material may be tailored to the steam reforming reaction at the given operating conditions. However, it should be noted, that advantageously substantially all the surface of the macroscopic structure is coated with the ceramic coating and preferably all or most of the ceramic coating supports the catalytically active material. Preferably, only the parts of the macroscopic coating which are connected to conductors, are not provided with the ceramic coating. The ceramic coating supporting the catalytically active material reduces or prevents the risk of carbon formation according to the reaction:

$$CH_4 \leftrightarrows C + 2H_2 \quad (A)$$

The coverage of the metallic structure with the ceramic coating supporting the catalytically active material ensures that the metallic phase of the macroscopic structure is covered by a coherent oxide layer which has less potential for carbon forming reactions. Furthermore, the catalytically active material of the oxide phase will catalyze the steam reforming reactions and bring the reactant gas towards, or even close to, thermodynamic equilibrium. This increases the partial pressure of hydrogen and decreases the partial pressure of methane thereby reducing or in many cases eliminating the thermodynamic potential for carbon formation according to reaction (A) above.

When the pressure shell comprises an inlet for letting in process gas and an outlet for letting out product gas, where the inlet is positioned so that the feed gas enters the structured catalyst in a first end of the structured catalyst and the product gas exits the structured catalyst from a second end of the structured catalyst, and when the at least two conductors both are connected to the structured catalyst at a position on the structured catalyst closer to the inlet than to the outlet, the at least two conductors can be placed in the relatively colder part of the reactor system. The first end of the structured catalyst has a lower temperature than the second end of the structured catalyst due to:

the feed gas fed led through the inlet may cool the at least two conductors before being heated by the structured catalyst further along the path of the gas through the structured catalyst;

the feed gas inlet into the first end of the structured catalyst will have lower temperature than the product gas leaving the second end of the structured catalyst, due to the heat supplied to the structured catalyst electrically, The endothermic nature of the steam reforming reaction absorbs heat, The structured catalyst is constructed to direct an electrical current to run from one conductor substantially to the second end of the structured catalyst and return to a second of the at least two conductors.

Therefore, the temperature profile in of the structured catalyst will correspond to a substantially continuously increasing temperature along the path of the feed gas through the structured catalyst. This corresponds to a substantially increasing conversion rate of methane in the feed gas to hydrogen and carbon monoxide.

Hereby, the current is led into the macroscopic structure and out from the macroscopic structure through conductors positioned in the relatively cold first end thereof. It is an advantage that the temperature of all electrically conducting elements except the macroscopic structure is kept down in order to protect the connections between the conductors and the structured catalyst. When the temperature of the conductors and other electrically conducting elements, except the macroscopic structure, is relatively low, less limitations on materials suitable for the conductors and other electrically conducting elements, except the macroscopic structure, exists. When the temperature of the electrically conducting elements increase, the resistivity thereof increases; therefore, it is desirable to avoid unnecessary heating of all other parts than the macroscopic structures within the reactor system.

Moreover, the combination of heat insulation and connection of the conductors to the first colder end of the macroscopic structure renders it possible to increase the pressure of the pressure shell to more than 5 bar.

It should be noted that the term "electrically conducting elements, except the macroscopic structure" is meant to cover the relevant electrically conducting elements arranged to connect the power supply to the structured catalyst and potential connections in between macroscopic structures or structured catalysts.

The combination of the substantially continuously increasing temperature profile of the structured catalyst along the path of the feed gas through the structured catalyst and a controllable heat flux from the structured catalyst, control of the reaction front of the chemical reaction is achievable.

As used herein, the term "macroscopic structure" is meant to denote a structure which is large enough to be visible with the naked eye, without magnifying devices. The dimensions of the macroscopic structure are typically in the range of tens of centimeters or of meters. Dimensions of the macroscopic structure are advantageously made to correspond at least partly to the inner dimensions of the pressure shell housing the structured catalyst, saving room for the heat insulation layer and conductors. Two or more macroscopic structures may be connected in order to provide an array of macroscopic structures having at least one of the outer dimensions in the range of meters, such as 0.5 m, 1 m, 2 m or 5 m. Such two or more macroscopic structures may be denoted "an array of macroscopic structures". In this case the dimensions of an array of macroscopic structures are advantageously made to correspond at least partly to the inner dimension of the pressure shell housing the structured catalyst (saving room for the heat insulation layer). A conceivable array of macroscopic structures could take up a volume of 0.1 to 10 $m^3$ or even larger. A "structured catalyst" may comprise a single macroscopic structure or an array of macroscopic structures, where the macroscopic structure(s) support(s) a ceramic coating supporting catalytically active material. If the structured catalyst comprises an array of macroscopic structures, the macroscopic structures may be electrically connected to each other; however, alternatively, the macroscopic structures are not electrically connected to each other. Thus, the structured catalyst may comprise two or more macroscopic structures positioned adjacent to each other. The macroscopic structure(s) may be extruded and sintered structures. The macroscopic structure(s) may alternatively be 3D printed and sintered.

The physical dimensions of the macroscopic structure may be any appropriate dimensions; thus, the height may be smaller than the width of the macroscopic structure or vice versa.

The macroscopic structure supports a ceramic coating, where the ceramic coating supports a catalytically active material. The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to the conductors do not have a coating thereon. The coating is a ceramic material with pores in the structure which allows for supporting catalytically active material on and inside the coating. Advantageously, the catalytically active material comprises catalytically active particles having a size in the range from about 5 nm to about 250 nm.

Preferably, the macroscopic structure has been manufactured by extrusion of a mixture of powdered metallic particles and a binder to an extruded structure and subsequent sintering of the extruded structure, thereby providing a material with a high geometric surface area per volume. Alternatively, the macroscopic structured has been 3D printed. Preferably, the extruded or 3D printed structure is sintered in a reducing atmosphere to provide the macroscopic structure. A ceramic coating, which may contain the catalytically active material, is provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure an especially high heat conductivity between the electrically heated macroscopic structure and the catalytically active material supported by the ceramic coating is possible, offering close and nearly direct contact between the heat source and the catalytically active material of the structured catalyst. Due to close proximity between the heat source and the catalytically active material the heat transfer is effective, so that the structured catalyst can be very efficiently heated. A compact reactor system in terms of gas processing per reactor system volume is thus possible, and therefore the reactor system housing the structured catalyst may be compact.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes which do not require subsequent sintering, such as powder bed fusion or direct energy deposition processes. Examples of such powder bed fusion or direct energy deposition processes are laser beam, electron beam or plasma 3D printing processes.

The reactor system of the invention does not need a furnace and this reduces the overall reactor size considerably. Moreover, it is an advantage that the amount of synthesis gas produced in a single pressure shell is increased considerably compared to known tubular steam reformers. In a standard tubular steam reformer, the amount of synthesis gas produced in a single tube of the tubular steam reformer is up to 500 $Nm^3/h$. In comparison, the reactor system of the invention is arranged to produce up to or more than 2000 $Nm^3/h$, e.g. even up to or more than 10000 $Nm^3/h$, within a single pressure shell. This can be done without the presence of $O_2$ in the feed gas and with less than 10% methane in the synthesis gas produced. When a single pressure shell houses catalyst for producing up to 10000 $Nm^3/h$ synthesis gas, it is no longer necessary to provide a plurality of pressure shells or means for distributing feed gas to a plurality of such separate pressure shells.

Another advantage of the reactor system is that the flow through the structured catalyst within the reactor system may be upflow, due to the structured catalyst comprising a macroscopic structure. Alternatively, the flow through the structured catalyst could be in the horizontal direction or any other appropriate direction. This is more difficult in the case where the reactor contains pellets due to the risk of fluidization, grinding, and blowing out the pellets. Thereby, a substantial amount of piping may be avoided, thus reducing plant costs. Furthermore, the possibility of upflow or horizontal flow increases the flexibility in plant design.

Preferably, the macroscopic structure comprises Fe, Cr, Al, or an alloy thereof. Such an alloy may comprise further elements, such as Si, Mn, Y, Zr, C, Co or combinations thereof. The catalytically active material may e.g. comprise nickel, ruthenium, rhodium, iridium, platinum, cobalt, or a combination thereof. Thus, one possible catalytically active material is a combination of nickel and rhodium and another combination of nickel and iridium. The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K, or combinations thereof. Preferably, the conductors and the macroscopic structure are made of different materials than the macroscopic structure. The conductors may for example be of iron, nickel, aluminum, copper, silver, or an alloy thereof. The ceramic coating is an electrically insulating material and will typically have a thickness in the range of around 100 μm, e.g. about 10-500 μm.

The macroscopic structure is advantageously a coherent or consistently intra-connected material in order to achieve electrical conductivity throughout the macroscopic structure, and thereby achieve thermal conductivity throughout the structured catalyst and in particular providing heating of the a catalytically active material supported by the macroscopic structure. By the coherent or consistently intra-connected material it is possible to ensure uniform distribution of current within the macroscopic structure and thus uniform distribution of heat within the structured catalyst. Throughout this text, the term "coherent" is meant to be synonymous to cohesive and thus refer to a material that is consistently intra-connected or consistently coupled. The effect of the structured catalyst being a coherent or consistently intra-connected material is that a control over the connectivity within the material of the structured catalyst and thus the conductivity of the macroscopic structure is obtained. It is to be noted that even if further modifications of the macroscopic structure are carried out, such as provision of slits within parts of the macroscopic structure or the implementation of insulating material within the macroscopic structure, the macroscopic structure is still denoted a coherent or consistently intra-connected material.

As shown in the figures, the gas flow through the structured catalyst is axial or co-axial with the length or z-axis of the structured catalyst. Even though the figures show that the z-axis of the structured catalyst is vertical, it should be noted that the reactor can be positioned in any suitable way, so that the structured catalyst and the gas flow through it can e.g. be horizontal, upside down compared to the figures, or angled at e.g in 45° to horizontal.

In this context, the term "hydrocarbon gas" is meant to denote a gas with one or more hydrocarbons and possibly other constituents. Thus, typically the hydrocarbon gas comprises $CH_4$ and optionally also higher hydrocarbons in relatively small amounts in addition to small amounts of other gasses. Higher hydrocarbons are components with two or more carbon atoms such as ethane and propane. Examples of "hydrocarbon gas" may be natural gas, town gas, naphtha or a mixture of methane and higher hydrocarbons. Hydrocarbons may also be components with other atoms than carbon and hydrogen such as oxygenates. The term "feed gas comprising hydrocarbons" is meant to denote a feed gas comprising a hydrocarbon gas with one or more hydrocarbons mixed with steam, hydrogen and possibly other constituents, such as carbon monoxide, carbon dioxide, and possibly also some nitrogen and argon. Typically, the feed gas let into the reactor system has a predetermined ratio of hydrocarbon gas, steam and hydrogen, and potentially also carbon dioxide.

Moreover, the term "steam reforming" is meant to denote a reforming reaction according to one or more of the following reactions:

$$CH_4 + H_2O \leftrightarrow CO + 3H_2 \quad (i)$$

$$CH_4 + 2H_2O \leftrightarrow CO_2 + 4H_2 \quad (ii)$$

$$CH_4 + CO_2 \leftrightarrow 2CO + 2H_2 \quad (iii)$$

Reactions (i) and (ii) are steam methane reforming reactions, whilst reaction (iii) is the dry methane reforming reaction.

For higher hydrocarbons, viz. $C_nH_m$, where n≥2, m≥4, equation (i) is generalized as:

$$C_nH_m + nH_2O \leftrightarrow nCO + (n+m/2)H_2 \quad (iv)$$

where n≥2, m≥4.

Typically, steam reforming is accompanied by the water gas shift reaction (v):

$$CO + H_2O \leftrightarrow CO_2 + H_2 \quad (v)$$

The term "steam methane reforming" is meant to cover the reactions (i) and (ii), the term "steam reforming" is meant to cover the reactions (i), (ii) and (iv), whilst the term "methanation" covers the reverse reaction of reaction (i). In most cases, all of these reactions (i)-(v) are at, or close to, equilibrium at the outlet from the reactor system.

The term "prereforming" is often used to cover the catalytic conversion of higher hydrocarbons according to reaction (iv). Prereforming is typically accompanied by steam reforming and/or methanation (depending upon the gas composition and operating conditions) and the water gas shift reaction. Prereforming is often carried out in adiabatic reactors but may also take place in heated reactors.

The steam reforming reaction is highly endothermic. High temperatures typically in excess of 800-850° C. are needed to reach acceptable conversions of the methane in the feed. A SMR consists of a number of tubes filled with catalyst pellets placed inside a furnace. The tubes are typically 10-13 meters long and will typically have an inner diameter between 80 and 160 mm. Burners placed in the furnace provide the required heat for the reactions by combustion of a fuel gas. A maximum average heat flux of 80000-90000 kcal/h/m² of inner tube surface is not uncommon. There is a general limitation to the obtainable heat flux due to mechanical constraints and the capacity is therefore increased by increasing the number of tubes and the furnace size. More details on the SMR type reactor system can be found in the art, e.g. "Synthesis gas production for FT synthesis"; Chapter 4, p. 258-352, 2004. As used herein, the abbreviation "SMR" is meant to denote an externally fired tubular steam methane reformer ad described above.

Typically, the feed gas will have undergone desulfurization to remove sulfur therein and thereby avoid deactivation of the catalysts in the process, prior to being inlet into the reactor system.

Optionally, the hydrocarbon gas will together with steam, and potentially also hydrogen and/or other components such as carbon dioxide, also have undergone prereforming according to reaction (iv) in a temperature range of ca. 350-550° C. to convert higher hydrocarbons as an initial step in the process, normally taking place downstream the desulfurization step. This removes the risk of carbon formation from higher hydrocarbons on catalyst in the subsequent process steps. Optionally, carbon dioxide or other components may also be mixed with the gas leaving the prereforming step to form the feed gas.

Typically, the feed gas entering into the reactor system has been preheated. However, due to the heat flux that can be provided by the structured catalyst, the feed gas entering the reactor system can be relatively cold. Thus, preheating the feed gas to a temperature between about 200 to about 450° C. may be sufficient.

The term "electrically conductive" is meant to denote materials with an electrical resistivity in the range from: $10^{-5}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^9$ to $10^{25}$ Ω·m at 20° C.

When the reactor system comprises a heat insulation layer between the structured catalyst and the pressure shell, appropriate heat and electrical insulation between the structured catalyst and the pressure shell is obtained. The presence of heat insulating layer between the pressure shell and the structured catalyst assists in avoiding excessive heating of the pressure shell, and assists in reducing thermal losses to the surroundings. The temperatures of the structured catalyst may reach up to about 1300° C., at least at some parts thereof, but by using the heat insulation layer between the structured catalyst and the pressure shell the temperature of the pressure shell can be kept at significantly lower temperatures of say 500° C. or even 200° C., which is advantageous as typical construction steel materials typically are unsuitable for pressure bearing application at temperatures above 1000° C. Moreover, a heat insulating layer between the pressure shell and the structured catalyst assists in control of the electrical current within the reactor system, since heat insulation layer is also electrically insulating. The heat insulation layer could be one or more layers of solid material, such as ceramics, inert material, refractory material or a gas barrier or a combination thereof. Thus, it is also conceivable that a purge gas or a confined gas constitutes or forms part of the heat insulation layer.

Moreover, it should be noted that the term "heat insulating material" is meant to denote materials having a thermal conductivity of about 10 W·m$^{-1}$·K$^{-1}$ or below. Examples of heat insulating materials are ceramics, refractory material, alumina based materials, zirconia based materials and similar.

Advantageously, any relevant gaps between the structured catalyst, the heat insulation layer, the pressure shell, and/or any other components inside the reactor system is filled with inert material, e.g. in the form of inert pellets. Such gaps are e.g. a gap between the lower side of the structured catalyst and the bottom of the pressure shell and a gap between the sides of the structured catalyst and the insulation layer covering the inner sides of the pressure shell. The inert material may e.g. be a ceramic material in the form of pellets or tiles. The inert material assists in controlling the gas distribution through the reactor system and in controlling the flow of the gas through the structured catalyst. Moreover, the inert material typically has a heat insulating effect.

In an embodiment, the pressure shell has a design pressure of between 5 bar and 30 bar. A pressure shell having a design pressure of about 5-15 bar is for example well suited for small scale configuration. As the hottest part of the reactor system is the structured catalyst which will be surrounded by heat insulation layer and within the pressure shell of the reactor system, the temperature of the pressure shell can be kept significantly lower than the maximum process temperature. This allows for having a relative low design temperature of the pressure shell of e.g. 700° C. or 500° C. or preferably 300° C. or 200° C. of the pressure shell whilst having maximum process temperatures of 900° C. or even 1100° C. or even up to 1300° C. on the structured catalyst. Material strength is higher at the lower of these temperatures (corresponding to the design temperature of the pressure shell as indicated above) which means that in contrast to the externally heated steam methane reforming reactor, such as a top fired or side fired SMR, the current reactor system can be designed for high(er) pressure operation. In an SMR the maximum tube wall temperature may be limited to ca. 1000° C. Another advantage is that the lower design temperature compared to an SMR means that in some cases the thickness of the pressure shell can be decreased thus saving costs.

In an embodiment, the pressure shell has a design pressure of between 30 bar and 200 bar, preferably between 80 and 180 bar.

The reactor system of the invention may be part of a plant, such as a hydrogen plant. Such a plant may advantageously comprise one or more compressors and/or pumps upstream the reactor system of the invention. The compressors/pumps are arranged to compress the feed to a pressure of between 30 and 200 bar upstream the reactor system. The constituents of the feed, viz. steam, hydrogen and hydrocarbon feed gas, may be compressed individually and fed individually into the reactor system of the invention. When the feed is pressurized upstream the reactor system of the invention and the reactor system comprises a pressure shell having a design pressure of between 30 and 200 bar, compression downstream of the reactor system of the invention may be made simpler or avoided completely. For a hydrogen plant integrated in a refinery plant where the hydrogen product is used for hydrotreating a hydrogen compressor to the hydrotreater may be avoided if the product gas from the reactor system has an outlet pressure of about 150-200 bar.

In an embodiment, the resistivity of the macroscopic structure is between $10^{-6}$ Ω·m and $10^{-7}$ Ω·m. A material with a resistivity within this range provides for an efficient heating of the structured catalyst when energized with a power source. Graphite has a resistivity of about $10^{-6}$ Ω·m at 20° C., kanthal has a resistivity of about $10^{-6}$ Ω·m at 20° C., whilst stainless steel has a resistivity of about $10^{-7}$ Ω·m at 20° C. Kanthal is the trademark for a family of iron-chromium-aluminum (FeCrAl) alloys. The macroscopic structure may for example be made of FeCrAlloy having a resistivity of ca. $1.5 \cdot 10^{-6}$ Ω·m at 20° C.

It should be noted, that the system of the invention may include any appropriate number of power supplies and any appropriate number of conductors connecting the power supply/supplies and the macroscopic structure(s) of the structured catalyst.

According to an embodiment of the reactor system, each of the at least two conductors are led through a pressure shell in a fitting so that the at least two conductors are electrically insulated from the pressure shell. The fitting may be, partly, of a plastic and/or ceramic material. The term "fitting" is meant to denote a device which allows for mechanically connecting two pieces of hardware in a pressure bearing configuration. Thereby, the pressure within the pressure shell may be maintained even though the at least two conductors are lead through it. Non-limiting examples of the fittings may be an electrically insulating fitting, a dielectric fitting, a power compression seal, a compression fitting or a flange. The pressure shell typically comprises side walls, end walls, flanges, and possibly further parts. The term "pressure shell" is meant to cover any of these components.

The fittings are positioned in connection with the first end of the macroscopic structure. For example, the fittings are positioned upstream the first end of the macroscopic structure as seen in the direction of the feed gas. Hereby the temperature of the fittings themselves will be kept relatively cold. The combination of heat insulation and the fittings in the relatively cold end of the pressure shell renders it possible to provide a pressure within the pressure shell of more than 5 bar, despite of the fittings through the walls of the pressure shell and despite the fact that the maximum temperature of the structured catalyst may reach about 950° C. If the fittings were not kept relatively cold, there would be a risk of mechanical errors such as deformations, and a leakage of gas from the pressure shell would be probable. Moreover, electrical connection between the at least two conductors and the pressure shell should be avoided. To this end, it is important to avoid excessive temperatures of the fitting. As an example, the fitting may comprise a polymer as well as a compression fitting.

In an embodiment, the pressure shell further comprises one or more inlets close to or in combination with at least one of the fittings in order to allow a cooling gas to flow over, around, close to or inside at least one conductor within the pressure shell. Hereby, the conductors are cooled and thus the temperature that the fitting experiences is kept down. If the cooling gas is not used, the conductors may be heated by the feed gas to the reactor system, resistance heating of conductor due to the applied current, and/or heat conduction from the structured catalyst. The cooling gas could e.g. be hydrogen, nitrogen, steam, carbon dioxide, or mixtures thereof. The temperature of the cooling gas at entry into the pressure shell may be e.g. about 100° C. or 200° C. or 250° C. In an embodiment, the conductor(s) is (are) hollow so that the cooling gas may flow through the conductor(s) and cool it (them) from within. By keeping the temperature of the fitting low, e.g. at around 100-200° C., it is easier to have a leak tight configuration. In an embodiment, a part of the feed gas, such as carbon dioxide and/or steam, is fed to the pressure shell as the cooling gas. In another embodiment, part of the feed gas or a gas with the same composition as the feed gas is used as cooling gas.

In an embodiment, the reactor system further comprises an inner tube in heat exchange relationship with the structured catalyst, where the inner tube is adapted to withdraw a product gas from the structured catalyst so that the product gas flowing through the inner tube or tubes is in heat exchange relationship with the gas flowing through the structured catalyst, but electrically separated from the structured catalyst. This is a layout which here is denoted a bayonet reactor system. In this layout the product gas within the inner tube assists in heating the process gas flowing through the structured catalyst. The electrical insulation between the inner tube and the structured catalyst could be gas in the form of a gap or distance between the inner tube and the structured catalyst or inert material loaded around the inner tube and the structured catalyst. The gas may pass through the structured catalyst in an up-flow or a down-flow direction. Even though the electrical insulation between the inner tube and the structured catalyst also provides for thermal insulation, such a thermal insulation effect is never complete and some heat transfer will take place over the electrical insulation.

In an embodiment, the connection between the structured catalyst and the at least two conductors is a mechanical connection, a welded connection, a brazed connection or a combination thereof. The structured catalyst may comprise terminals physically and electrically connected to the structured catalyst in order to facilitate the electrical connection between the macroscopic structure of the structured catalyst and the at least two conductors. The term "mechanical connection" is meant to denote a connection where two components are held together mechanically, such as by a threaded connection or by clamping, so that a current may run between the components.

In an embodiment, the macroscopic structures in an array of macroscopic structures may be electrically connected to each other. The connection between the two or more macroscopic structures may be by mechanical connection, clamping, soldering, welding, or any combination of these connection methods. Each macroscopic structure may comprise terminals in order to facilitate the electrical connections. The two or more macroscopic structures may be connected to the power supply in serial or parallel connection. The electrical connection between the two or more macroscopic structures is advantageously coherent and uniform along the connection surface between the two or more macroscopic structures, so that the two or more macroscopic structures act as a single coherent or consistently intra-connected material; hereby, uniform electrical conductivity throughout the two or more macroscopic structures is facilitated. Alternatively, or additionally, the structured catalyst may comprise an array of macroscopic structures which are not electrically connected to each other. Instead, two or more macroscopic structures are placed together within the pressure shell, but not connected electrically to each other. In this case, the structured catalyst thus comprises macroscopic structures connected in parallel to the power supply.

A ceramic coating, with or without catalytically active material, may be added directly to a metal surface by wash coating. The wash coating of a metal surface is a wellknown process; a description is given in e.g. Cybulski, A., and Moulijn, J. A., Structured catalysts and reactors, Marcel Dekker, Inc, New York, 1998, Chapter 3, and references herein. The ceramic coat may be added to the surface of the macroscopic structure and subsequently the catalytically active material may be added; alternatively, the ceramic coat comprising the catalytically active material is added to the macroscopic structure.

Extruding and sintering, or 3D printing and sintering, a macroscopic structure results in a uniformly and coherently shaped macroscopic structure, which can afterwards be coated with the ceramic coating.

The macroscopic structure and the ceramic coating may have been sintered in an oxidizing atmosphere in order to form chemical bonds between the ceramic coating and the macroscopic structure; this provides for an especially high heat conductivity between the macroscopic structure and the catalytically active material supported by the ceramic coating. Thereby, the structured catalyst is compact in terms of heat transfer to the active catalytic site, and a reactor system housing the structured catalyst may be compact and limited mainly by the rate of the chemical reaction. There is no heat transfer from outside the pressure shell to the structured catalyst as would be the case through the tube walls to the catalyst within the tubes for the SMRs used in the art.

In an embodiment, the structured catalyst has at least one electrically insulating part arranged to increase the current path between the conductors to a length larger than the largest dimension of the structured catalyst. The provision of a current path between the conductors larger than the largest dimension of the structured catalyst may be by provision of electrically insulating part(s) positioned between the conductors and preventing the current running through some part of the structured catalyst. Such electrically insulating parts are arranged to increase the current path and thus increase the resistance through the structured catalyst. Hereby, the current path through the structured catalyst can be e.g. more than 50%, 100%, 200%, 1000%, or even 10000% longer than the largest dimension of the structured catalyst.

Moreover, such electrically insulating parts are arranged to direct the current from one conductor, which is closer to the first end of the structured catalyst than to the second end, towards the second end of the structured catalyst and back to a second conductor closer to the first end of the structured catalyst than to the second end. Preferably, the current is arranged to run from the first end of the structured catalyst to the second and back to the first end. As seen in the figures, the first end of the structured catalyst is the top end thereof. The arrow indicated "z" in FIGS. 5-7 indicates a z-axis along the length of the structured catalyst. The principal current path throughout the structured catalyst will have a positive or negative value of z-coordinate of the accompanied current density vector along most of the length of the current path. By principal current path is meant the path of the electrons through a macroscopic structure of the structured catalyst with the highest current density. The principal current path can also be understood as the path having the minimum length through the macroscopic structure of the structured catalyst. Seen geometrically, the principal current path can be quantified as the largest current density vector within a plane perpendicular to the gas flow direction of a coherent section of the macroscopic structure. At the bottom of the structured catalyst, as shown in the figures, the current will turn, and here the z-coordinate of the accompanied current density vector will be zero.

As used herein, the term coherent section is meant to denote a cross-section area of the macroscopic structure wherein all walls of the coherent section are geometrically connected to one or more other walls of the coherent section within the same plane.

In an embodiment, the structured catalyst has at least one electrically insulating part arranged to direct a current through the structured catalyst in order to ensure that for at least 70% of the length of said structured catalyst, a current density vector of a principal current path has a non-zero component value parallel to the length of said structured catalyst. Thus, for at least 70% of the length of the structured catalyst, the current density vector will have a positive or negative component value parallel to the length of the structured catalyst. Thus, for at least 70%, e.g. for 90% or 95%, of the length of structured catalyst, viz. along the z-axis of the structured catalyst as seen in FIGS. 5 to 10, the current density vector of a principal current path will have a positive or negative value along the z-axis. This means that the current is forced from the first end of the structured catalyst towards the second end, and subsequently is forced towards the first end again. The temperature of the gas entering the first end of the structured catalyst and the endothermic steam reforming reaction taking place over the structured catalyst absorbs heat from the structured catalyst. For this reason, the first end of the structured catalyst remains colder than the second end, and by ensuring that the current density vector of the principal current path has a non-zero component value parallel to the length of said structured catalyst, this takes place with a substantially continuously increasing temperature profile, which gives a controllable reaction front. In an embodiment the current density vector has a non-zero component value parallel to the length of said structured catalyst in 70% of the length of said structured catalyst, preferably 80%, more preferably 90%, and even more preferably 95%. It should be noted that the term "the length of the structured catalyst" is meant to denote the dimension of the structured catalyst in the direction of the gas flow. In the structured catalysts as shown in the figures, the length is the longitudinal direction, viz. the longest dimension thereof. This is indicated by the arrow denote z in some of the figures.

Non-limiting examples of insulating parts are cuts, slits, or holes in the structure. Optionally, a solid insulating material such as ceramics in cuts or slits in the structure can be used. In a case where the solid insulating material is a porous ceramic material, the catalytically active material may advantageously be incorporated in the pores, by e.g. impregnation. A solid insulating material within a cut or slit assists in keeping the parts of the structured catalyst on the sides of the cut or slit from each other. As used herein, the term "largest dimension of the structured catalyst" is meant to denote the largest inner dimension of the geometrical form taken up by the structured catalyst. If the structured catalyst is box-formed, the largest dimension would be the diagonal from one corner to the farthest corner, also denoted the space diagonal.

It should be noted that even though the current path through the structured catalyst may be arranged to be twist or winded through the structured catalyst due to the electrically insulating parts arranged to increase the current path, the gas passing through the reactor system is inlet at one end of the reactor system, passes through the structured catalyst once before being outlet from the reactor system. Inert material is advantageously present in relevant gaps between the structured catalyst and the rest of the reactor system to ensure that the gas within the reactor system passes through the structured catalyst and the catalytically active material supported thereby.

In an embodiment the length of the gas passage through the structured catalyst is less than the length of the passage of current from one conductor through the structured catalyst and to the next conductor. The ratio of the length of the gas passage to the length of the current passage may be less than 0.6, or 0.3, 0.1, or even down to 0.002.

In an embodiment, the structured catalyst has at least one electrically insulating part arranged to make the current path through the structured catalyst a zigzag path. Here, the terms "zigzag path" and "zigzag route" is meant to denote a path that has corners at variable angles tracing a path from one conductor to another. A zigzag path is for example a path going upwards, turning, and subsequently going downwards. A zig-zag path may have many turns, going upwards and subsequently downwards many times through the structured catalyst, even though one turn is enough to make the path a zigzag path.

It should be noted that the insulating parts arranged to increase the current path are not necessarily related to the ceramic coating on the macroscopic structure; even though this ceramic coating is also considered electrically insulating, it does not change the length of the current path between the conductors connected to the macroscopic structure.

In an embodiment, the macroscopic structure has a plurality of near-parallel or parallel channels, a plurality of non-parallel channels, and/or a plurality of labyrinthic channels, where the channels have walls defining the channels. Thereby, several different forms of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way molecules of the gas flowing through the macroscopic structure will mostly tend to hit a wall inside the channels instead of just flowing straight through a channel without being in contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. Moreover, the thickness of the walls should be small enough to provide a relatively large electrical resistance and large enough to provide sufficient mechanical strength. The walls may e.g. have a thickness of between 0.2 and 2 mm, such as about 0.5 mm, and the ceramic coating supported by the walls has a thickness of between 10 μm and 500 μm, such as between 50 μm and 200 μm, such as 100 μm. In another embodiment the macroscopic structure of the structured catalyst is cross-corrugated.

In general, when the macroscopic structure has parallel channels, the pressure drop from the inlet to the outlet of the reactor system may be reduced considerably compared to a reactor where the catalyst material is in the form of pellets such as a standard SMR.

In an embodiment, the reactor system further comprises a bed of a second catalyst material upstream the structured catalyst within the pressure shell. Here, the term "upstream" is seen from the flow direction of the feed gas. Thus, the term "upstream" is here meant to denote that the feed gas is directed through the bed of second catalyst material prior to reaching the structured catalyst. This provides for a situation where the second catalyst material can be arranged for prereforming the feed gas (according to reaction (iv) above), so that the reactor system provides prereforming and steam reforming within one pressure shell. This can also provide a situation where the hydrocarbons in the feed gas react with steam and/or $CO_2$ over the second catalyst material (such as according to reactions (i)-(v) above) and that the process gas to the structured catalyst then has a lower content of hydrocarbons than the feed gas to the second catalyst material. The second catalyst can alternatively or additionally be a catalyst arranged for also capturing sulfur compounds in the feed gas. No specific heating needs to be provided to the bed of second catalyst material; however, the bed of second catalyst material may be heated indirectly if it is in close proximity to the structured catalyst. Alternatively, the second catalyst material may be heated.

In an embodiment, the reactor system further comprises a third catalyst material in the form of catalyst pellets, extrudates, or granulates loaded into the channels of the structured catalyst. In this embodiment, the reactor system will thus have a catalytically active material in the coating of the macroscopic structure as well as a third catalyst material in the form catalyst pellets, extrudates, or granulates within the channels of the structured catalyst. This allows for boosting the catalytic reactivity within the channels, or segments of these, of the structured catalyst. In order to clarify the terminology used here, it is noted that the term "structured catalyst" may also be denoted "a first catalyst material" to distinguish it from the second and/or third and/or fourth catalyst material.

The pellets are e.g. prepared in a dimension to loosely match the size of channels to form a single string of pellets stacked upon each other within a channel of the macroscopic structure. Alternatively, the pellets, extrudates or granulates may be prepared in a dimension significantly smaller than the channel size to form a packed bed inside each channel. As used herein, the term "pellet" is meant to denote any well-defined structure having a maximum outer dimension in the range of millimeters or centimeters, while "extrudate" and "granulate" are meant to define a catalyst material with a maximum outer dimension defined within a range.

In an embodiment a bed of fourth catalyst material is placed within the pressure shell and downstream the structured catalyst. Such fourth catalyst material may be in the form of catalyst pellets, extrudates or granulates. This provides for a situation where the fourth catalyst material can be arranged for lowering the approach to equilibrium of the gas leaving the structured catalyst by making a pseudo adiabatic equilibration of the steam reforming reaction.

In an embodiment the second, third, and fourth catalyst material are catalyst materials suitable for the steam reforming reaction, the prereforming reaction, or the water gas shift reaction. Examples of relevant such catalysts are $Ni/MgAl_2O_4$, $Ni/CaAl_2O_4$, $Ni/Al_2O_4$, and $Cu/Zn/Al_2O_3$. In a configuration where a combination of the second, third, and fourth catalyst material is included in the reactor system, the catalyst of each catalyst material can be different.

In an embodiment, the material of the macroscopic structure is chosen as a material arranged to supply a heat flux of 500 $W/m^2$ to 50000 $W/m^2$ by resistance heating of the material. Preferably, resistance heating of the material supplies a heat flux of between 5 $kW/m^2$ and 12 $kW/m^2$, for example between 8 $kW/m^2$ and 10 $kW/m^2$. The heat flux is given as heat per geometric surface area of the surface exposed to the gas.

In an embodiment, the geometric surface area of the macroscopic structure is between 100 and 3000 $m^2/m^3$, such as between 500 and 1100 $m^2/m^3$. The heat flux from the material is advantageously chosen to match the reactivity of the catalytically active material.

In an embodiment the structured catalyst comprises a first part arranged to generate a first heat flux and a second part arranged to generate a second heat flux, where the first heat flux is lower than the second heat flux, and where the first part is upstream the second part. Here, the term "the first part is upstream the second part" is meant to denote, that the gas fed into the reactor system reaches the first part before the gas reaches the second part. The first part and second part of the structured catalyst may be two different macroscopic structures supporting ceramic coating supporting catalytically active material, where the two different macroscopic structures may be arranged to generate different heat fluxes for a given electrical current and voltage. For instance, the first part of the structured catalyst may have a large surface area, whilst the second part of the structured catalyst has a smaller surface area. This may be accomplished by providing a structured catalyst in the second part having a smaller cross sectional area than the cross sectional area of the first part. Alternatively, the current path through the first part of the structured catalyst may be more straight than the current path through the second part of the structured catalyst, thus making the current twist and wind more through the second part than through the first part of the structured catalyst, whereby the current generates more heat in the second part of the structured catalyst than in the first part. As mentioned before, slits or cuts in the macroscopic structure may make the current path zigzag through the macroscopic structure. It should be noted, that the first and second part of the structured catalyst may experience different electrical currents and voltages in order to be able to supply different heat fluxes. However, the different heat fluxes of the first and second part may also be achieved by supplying the same electrical current and voltage through/over the first and second part, due to different physical properties of the first and second part as indicated above.

In an embodiment, the reactor system further comprises a control system arranged to control the electrical power supply to ensure that the temperature of the gas exiting the pressure shell lies in a predetermined range and/or to ensure that the conversion of hydrocarbons in the feed gas lies in a predetermined range and/or to ensure the dry mole concentration of methane lies in a predetermined range and/or to ensure the approach to equilibrium of the steam reforming reaction lies in a predetermined range. Typically, the maximum temperature of the gas lies between 500° C. and 1000° C., such as between 850° C. and 1000° C., such as at about 950° C., but even higher temperatures are conceivable, e.g. up to 1300° C. However, the maximum temperature of the gas exiting the reactor system may be as low as 500° C., for instance in a case where the reactor system is of the bayonet type. The maximum temperature of the gas will be achieved close to the most downstream part of the structured catalyst as seen in the flow direction of the feed gas. However, when a bayonet type layout is used, the maximum temperature of the gas exiting the reactor system may be somewhat lower, due to the heat exchange with the feed gas; the maximum temperature of the gas exiting a bayonet type reactor system according to the invention may be between 500 and 900° C. The control of the electrical power supply is the control of the electrical output from the power supply. The control of the electrical power supply may e.g. be carried out as a control of the voltage and/or current from the electrical power supply, as a control of whether the electrical power supply is turned on or off or as a combination hereof. The power supplied to the structured catalyst can be in the form of alternating current or direct current.

The voltage between the at least two conductors can be any appropriate voltage arranged to provide the desired heat flux. If the voltage is too low, the heat flux may become too low, and if the voltage is too high, the risk of electric arcs is increased. Exemplary values are e.g. a voltage between 50 and 4000 V, such as between 100 and 1000 V. Such values will render the compactness of the macroscopic structure and thus of the reactor system possible. Moreover, the current running between conductors through the macroscopic structure can be any appropriate current which together with the chosen voltage will provide the desired heat flux. The current may e.g. be between 100 and 2000 A, such as between 200 and 1500 A.

The predetermined temperature range of the gas exiting the pressure shell/the reactor system is preferably the range from 500 to 1300° C., preferably in the range from 800° C. to 1150° C., such as 900° C. to 1000° C. Preferably, the range of approach to equilibrium of the steam methane reforming reaction is between 1 and 60° C., more preferably between 5 and 30° C. or most preferably between 5 and 20° C.

In order to control the temperature of a reaction, the heat added/removed from a reactor system needs to be balanced against the heat consumed/produced by the chemical reaction. The addition/removal of heat needs to be balanced against the rate of reaction and especially the approach to equilibrium as defined by β, where β is the ratio between the reaction quotient and the equilibrium constant of a reaction. A value of β approaching 1 means the reaction mixture is close to equilibrium and values approaching 0 means the reaction mixture is far from equilibrium. In general, it is desirable to have as high a rate of reaction as possible, which is achieved at a low β, as long as the temperature can be sufficiently controlled in parallel by balancing the energy added.

In the case of the endothermic steam methane reforming reaction, heat needs to be added to ensure the reaction continues to proceed as otherwise the reaction will be equilibrated and the β value will approach 1 and the reaction will slow down. However, on the other side, it is undesirable if the temperature increases faster than the rate of reaction can follow as exposing unconverted hydrocarbons to high temperatures can result in carbon formation. A good way to follow this behavior is by the approach to equilibrium. The approach to equilibrium of the steam reforming reaction is found by initially calculating the reaction quotient (Q) of the given gas as:

$$Q = \frac{y_{CO} \cdot y_{H_2}^3}{y_{CH_4} \cdot y_{H_2O}} \cdot P^2$$

Here $y_j$ is the molar fraction of compound j, and P is the total pressure in bar. This is used to determine the equilibrium temperature ($T_{eq}$) at which the given reaction quotient is equal to the equilibrium constant:

$$Q = K_{SMR}(T_{eq})$$

where $K_{SMR}$ is the thermodynamic equilibrium constant of the steam methane reforming reaction. The approach to equilibrium of the steam methane reforming ($\Delta T_{app,SMR}$) reaction is then defined as:

$$\Delta T_{app,SMR} = T - T_{eq}$$

Where T is the bulk temperature of the gas surrounding the catalyst material used, such as the structured catalyst.

To ensure good performance of a steam reforming catalyst, it is desirable that the catalyst continuously works towards decreasing $\Delta T_{app,SMR}$. Classically, large scale industrial SMRs have been designed to obtain an approach to equilibrium of 5-20° C. at the outlet thereof.

With the current invention it is possible to control the heat flux and match this directly to the kinetic performance of the structured catalyst, as these are independent to some extent.

In an embodiment, the structured catalyst within the reactor system has a ratio between the area equivalent diameter of a horizontal cross section through the structured catalyst and the height of the structured catalyst in the range from 0.1 to 2.0. The area equivalent diameter of the cross section through the reactor system is defined as the diameter of a circle of equivalent area as the area of the cross section. When the ratio between the area equivalent diameter and the height of the structured catalyst is between 0.1 and 2.0, the pressure shell housing the structured catalyst may be relatively small compared to current SMRs. Each reactor system may process a larger amount of feed gas than is possible in one tube of an SMR. Hereby, the amount of outside piping to the reactor system may be reduced compared to a current SMR, and thereby the cost of such piping is reduced. Typically, the gas flows through the reactor system in an upflow or downflow direction, so that the gas flows through channels in the structured catalyst along the height thereof. When the structured catalyst comprises a number of or an array of macroscopic structures, the individual macroscopic structures within the array may be placed side by side, on top of each other or in a combination thereof. It is stressed, that when the structured catalyst comprises more than one macroscopic structures, the dimensions of the structured catalyst are the dimensions of the more than one macroscopic structures. Thus, as an example, if the structured catalyst comprises two macroscopic structures, each having the height h, put on top of each other, the height of the structured catalyst is 2 h.

The volume of the structured catalyst is chosen in consideration of the desired approach to equilibrium and/or temperature and/or hydrocarbons conversion and/or dry mole concentration of hydrocarbons in the product gas and/or temperature out of the reactor system correlated to the heat generation capacity of the macroscopic structure and/or to ensure the dry mole concentration of hydrocarbons in the product gas lies in a predetermined range and/or to ensure the approach to equilibrium of the steam methane reforming reaction (reaction (i)) lies in a predetermined range.

In an embodiment, the height of the reactor system is between 0.5 and 7 m, more preferably between 0.5 and 3 m. Exemplary values of the height of the reactor system is a height of less than 5 meters, preferably less than 2 m or even 1 m. The dimensions of the reactor system and of the structured catalyst within the reactor system are correlated; of course, the pressure shell and heat insulation layer render the reactor system somewhat larger than the structured catalyst itself. For comparison, industrial scale SMRs are typically constructed of catalyst tubes having a length of 10 m or above to maximize external surface area of the tubes. The present invention is advantageous in that such confinement in the design of the reactor system are superfluous.

As used herein the term "reactor system comprising a structured catalyst" is not meant to be limited to a reactor system with a single macroscopic structure. Instead, the term is meant to cover both a structured catalyst with a macroscopic structure, ceramic coating and catalytically active material as well as an array of such macroscopic structures.

Another aspect of the invention relates to a process for carrying out steam reforming of a feed gas comprising hydrocarbons in a reactor system comprising a pressure shell housing a structured catalyst arranged to catalyze steam reforming of a feed gas comprising hydrocarbons. The structured catalyst comprising a macroscopic structure of an electrically conductive material, and the macroscopic structure supports a ceramic coating. The ceramic coating supports a catalytically active material and the reactor system is provided with heat insulation between the structured catalyst and the pressure shell. The reactor system is provided with heat insulation between the structured catalyst and the pressure shell. The process comprises the following steps:

pressurizing a feed gas comprising hydrocarbons to a pressure of at least 5 bar,
supplying the pressurized feed gas to the reactor system,
allowing the feed gas to undergo steam reforming reaction over the structured catalyst and outletting a product gas from the reactor system, and
supplying electrical power via electrical conductors connecting an electrical power supply placed outside the pressure shell to the structured catalyst, allowing an electrical current to run through the macroscopic structure, thereby heating at least part of the structured catalyst to a temperature of at least 500° C.

The process provides advantages similar to those outlined for the reactor system. The product gas is a synthesis gas. Synthesis gas is a gas comprising carbon monoxide and hydrogen as well as other components such steam, carbon dioxide, and methane. However, the process may comprise further steps carried out on the product gas, such as purification, pressurization, heating, cooling, water gas shift reaction, etc. to provide the final product gas for an application downstream the reactor system of this invention.

It should be noted that the feed gas may comprises individual feed gasses, such as steam, hydrocarbon gas, carbon dioxide and hydrogen, and that the step of pressurizing the feed gas may comprise pressurizing individual feed gasses individually. Moreover, it should be noted that the order in which the steps of the process are written are not necessarily the order in which the process steps take place, in that two or more steps may take place simultaneously, or the order may be different that indicated above.

In an embodiment the process comprises the step of pressurizing the gas upstream the pressure shell to a pressure of up to at least 5 bar. A pressure shell with a design pressure of between 5 and 15 bar is well suited for small scale configuration. For larger scale configurations, the pressure shell may have a design pressure of e.g. 15 bar, 30 bar or even up to 50 bar. Even design pressures of up to 150 or 200 bar are conceivable.

In an embodiment of the process according to the invention, the temperature of the feed gas let into the reactor system is between 200° C. and 700° C. For externally heated SMRs, the temperature of the feed gas would normally be heated to a temperature between 450° C. and 650° C.; however, since the reactor system used in the process is an internally heated reactor system, the temperature of the feed gas may be as low as 200° C. However, in all embodiments the temperature and the pressure of the feed gas are adjusted to ensure that the feed gas is above the dew point.

In an embodiment of the process of the invention, the structured catalyst is heated so that the maximum temperature of the structured catalyst lies between 500° C. and 1300° C. Preferably, the maximum temperature of the structured catalyst lies between 700° C. and 1100° C., such as between 900° C. and 1000° C. The maximum temperature of the structured catalyst depends upon the material of the macroscopic structure; thus, if the macroscopic structure is of FeCrAlloy, which melts at a temperature of between 1380° C. and 1490° C. (depending on the actual alloy), the maximum temperature should be somewhat below the melting point, such as at about 1300° C. if the melting point of the macroscopic structure is at about 1400° C., as the material will become soft and ductile when approaching the melting point. The maximum temperature may additionally be limited by the durability of the coating and catalytically active material.

In an embodiment the process according to the invention further comprises the step of inletting a cooling gas through an inlet through the pressure shell in order to allow a cooling gas to flow over at least one conductor and/or fitting. The cooling gas may advantageously be hydrogen, nitrogen, steam, carbon dioxide or any other gas suitable for cooling the area or zone around the at least one conductor. A part of the feed gas, such as carbon dioxide and/or steam, may be fed to the pressure shell as the cooling gas.

In an embodiment of the process, the space velocity of gas, evaluated as flow of gas relative to the geometric surface area of the structured catalyst, is between 0.6 and 60 $Nm^3/m^2/h$, such as between 3 and 17 $Nm^3/m^2/h$, or such as between 9 and 14 $Nm^3/m^2/h$. Given relative to the occupied volume of the structured catalyst, the space velocity is between 700 $Nm^3/m^3/h$ and 70000 $Nm^3/m^3/h$, such as between 3500 $Nm^3/m^3/h$ and 20000 $Nm^3/m^2/h$, or such as between 11000 $Nm^3/m^3/h$ and 16000 $Nm^3/m^3/h$. Given as a space velocity relative to the volume of active catalyst, i.e. the volume of the ceramic coat, it is between 6000 $Nm^3/m^3/h$ and 1200000 $Nm^3/m^3/h$. Operating within these ranges of the space velocity allows for a desired conversion. It should be noted, that the space velocity of the gas is meant to denote the space velocity of the gas entering the reactor system, viz. both the feed gas and the cooling gas.

In an embodiment according to the invention, the process further comprises the step of inletting a cooling gas through an inlet through the pressure shell in order to allow a cooling gas to flow over at least one conductor and/or fitting. The cooling gas may be any appropriate gas; examples of such gasses are hydrogen, nitrogen, steam, carbon dioxide, or mixtures thereof. The cooling gas may flow through the conductor(s) and cool it (them) from within; in this case, the conductor(s) need(s) to be hollow to accommodate the cooling gas flowing within it/them. Part of the feed gas or a gas with the same composition as the feed gas may be used as cooling gas.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

SHORT DESCRIPTION OF THE FIGURES

Figure 7:
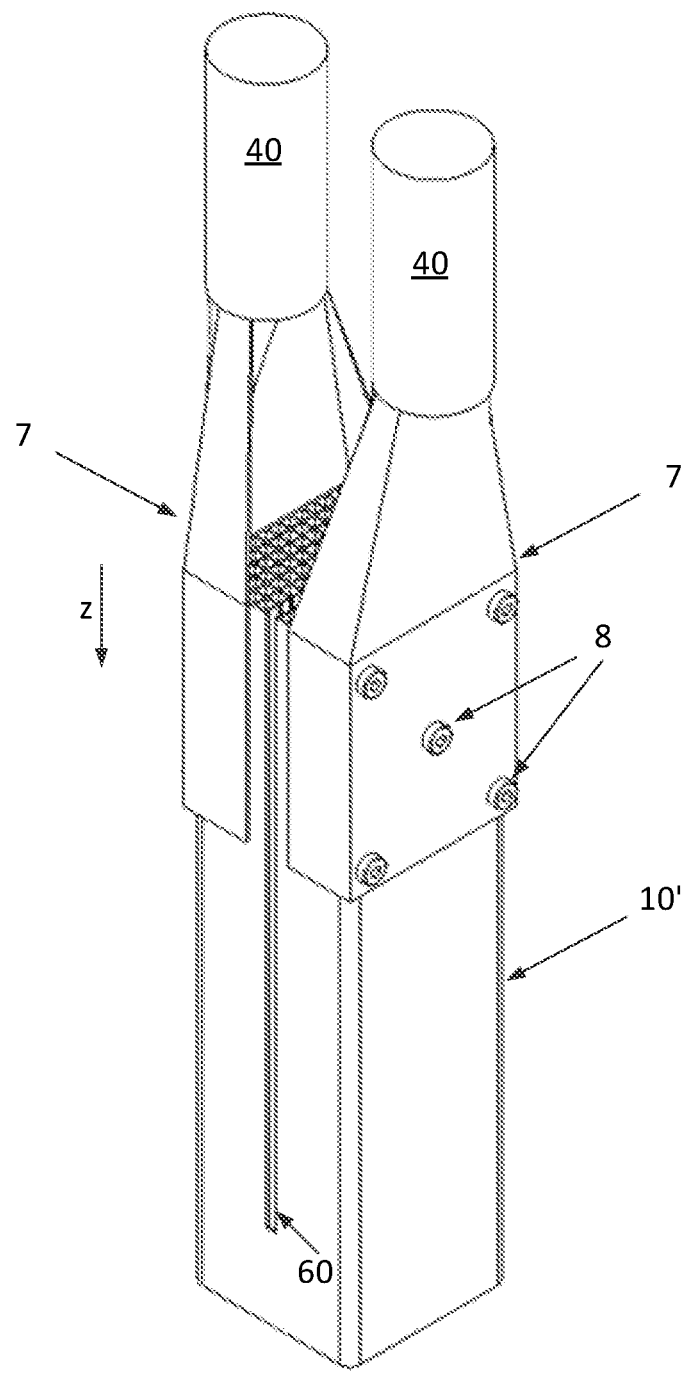
Figure 8:
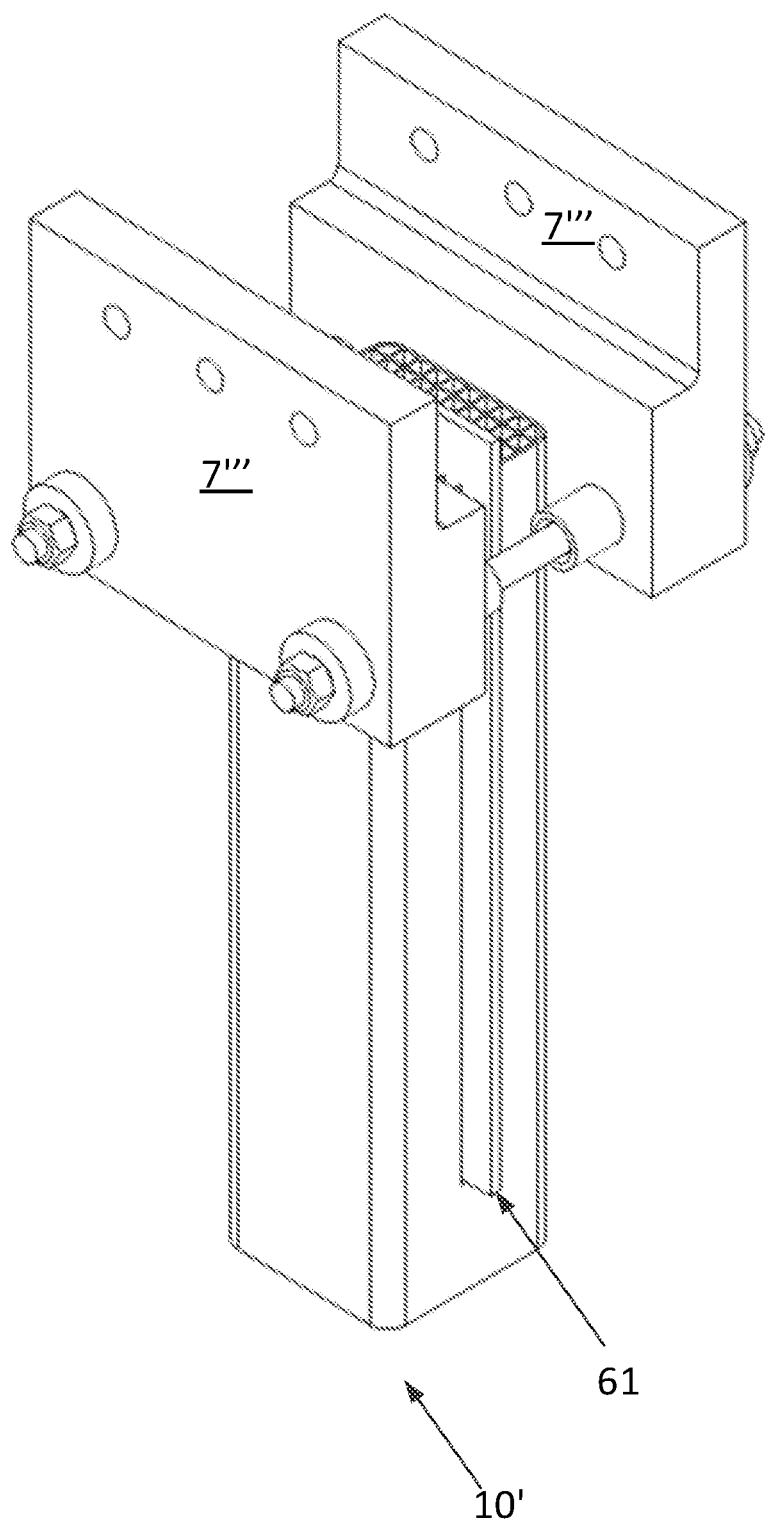
Figure 10:
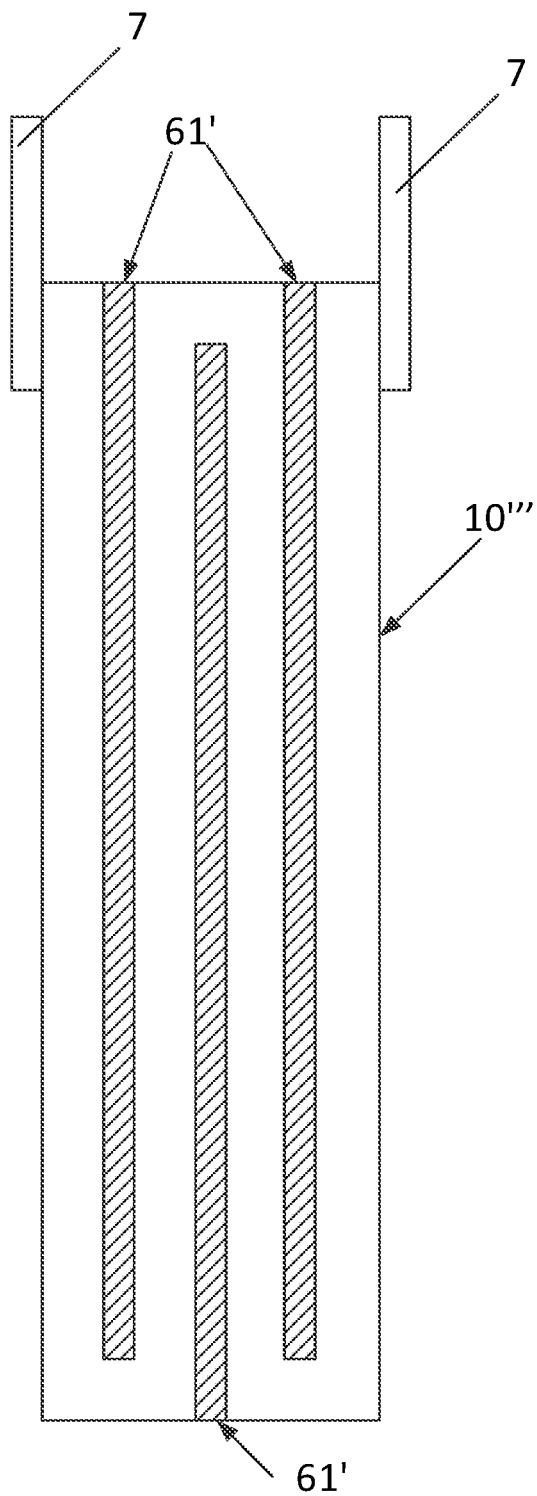
Figure 11A:
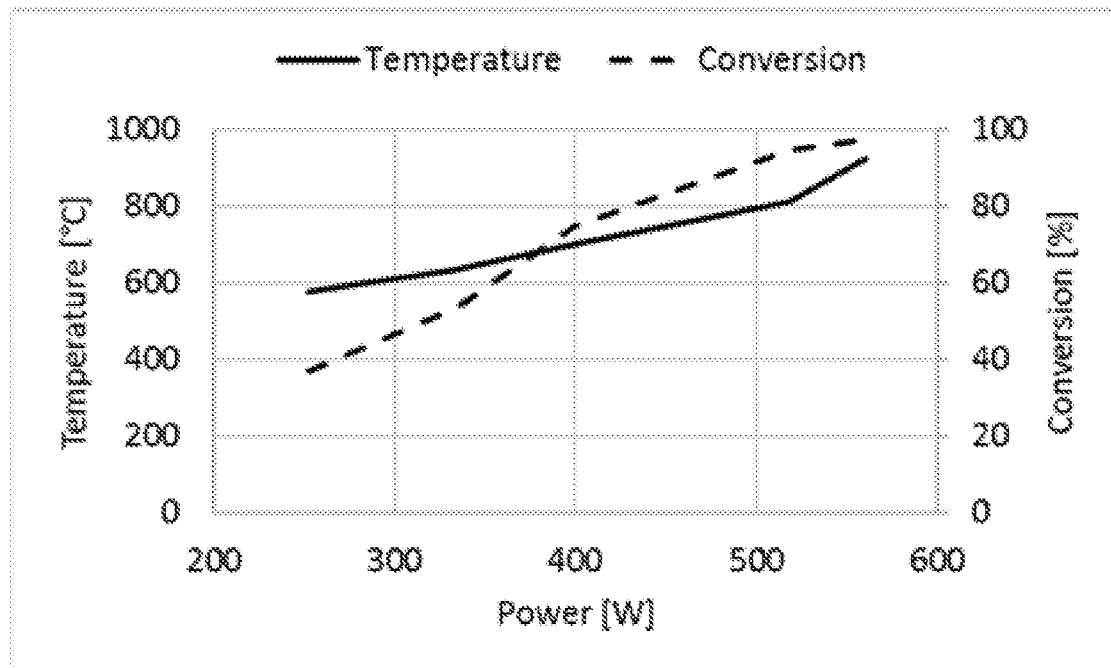
Figure 11B:
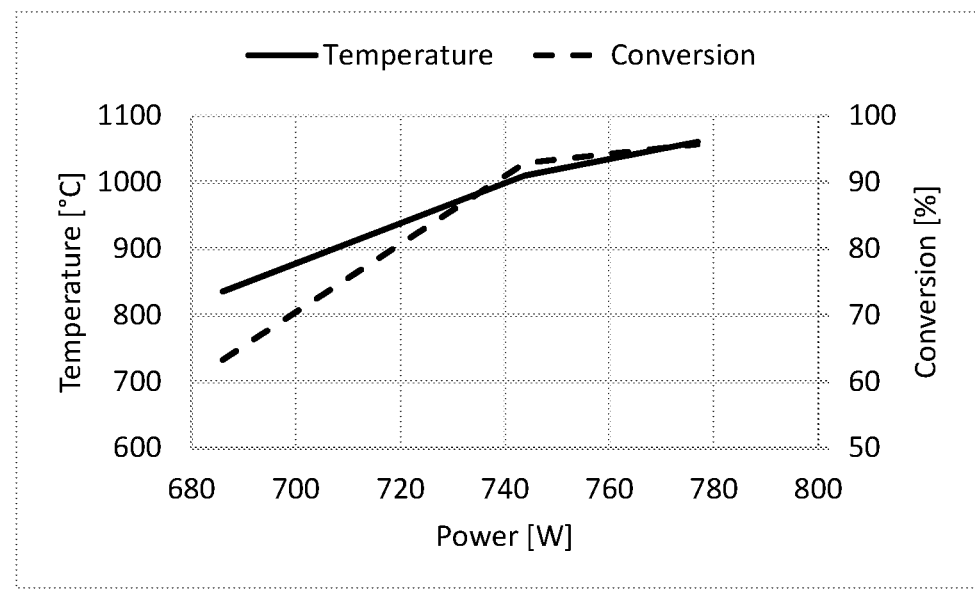
Figure 12A:
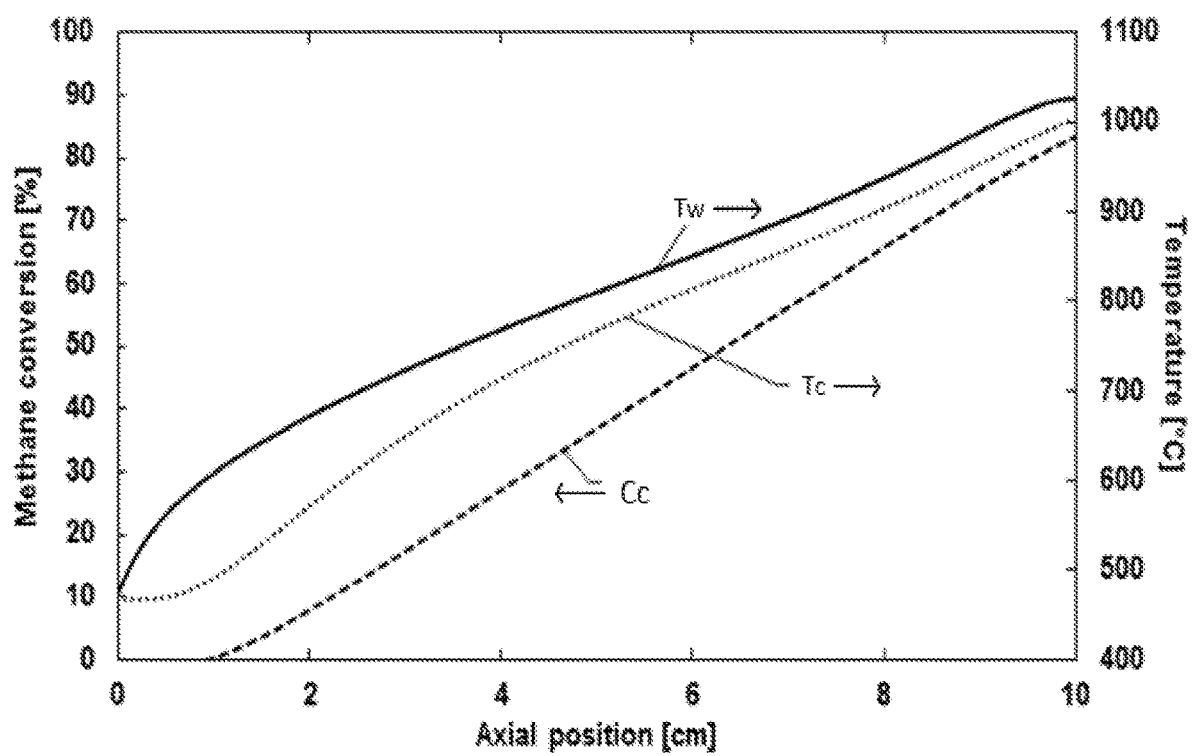
Figure 12B:
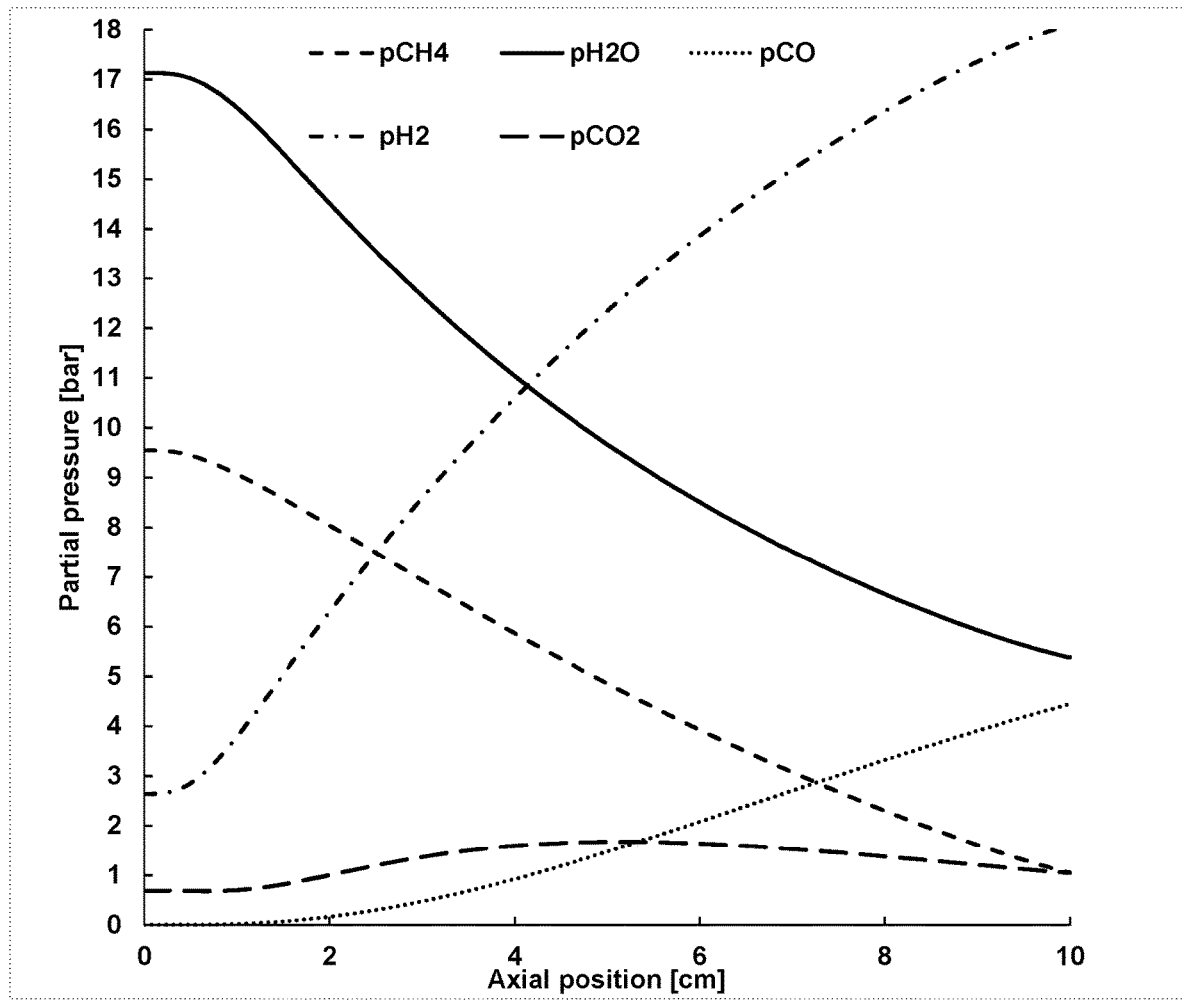
Figure 13:
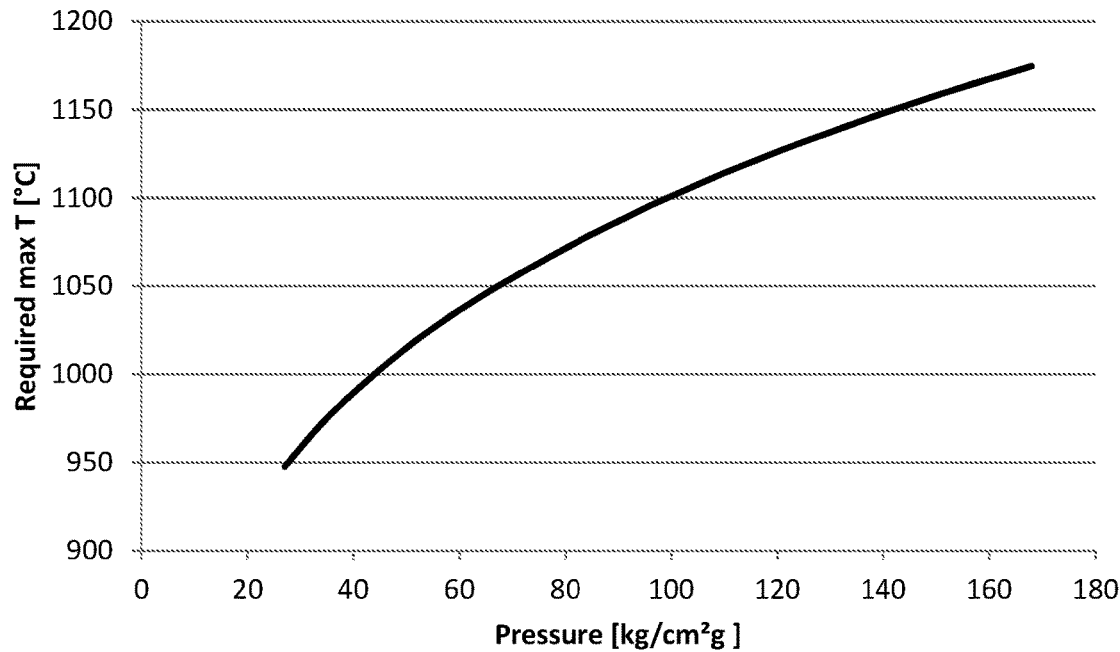
Figure 14:
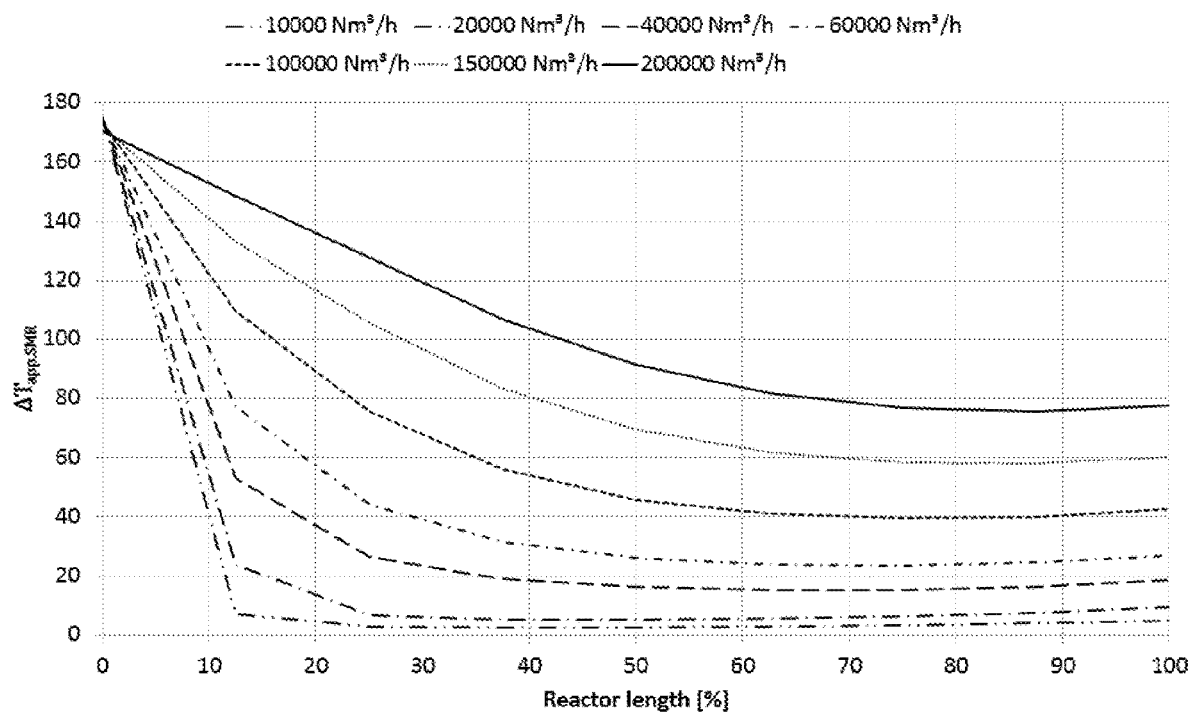

FIGS. 7, and 8 show embodiments of a structured catalyst with connectors;

FIG. 9a shows an embodiment of a structured catalyst for use in the reactor system of the invention;

FIG. 9b shows the current density of the structured catalyst shown in FIG. 9a as a function of the electrical effect transferred to the structured catalyst;

FIG. 10 a schematic drawing of a cross-section through structured catalyst with electrically insulating parts;

FIGS. 11a and 11b show temperature and conversion profiles as a function of electrical effect transferred to the structured catalyst;

FIGS. 12a and 12b show simulation results for temperatures and gas composition along the length of the structured catalyst;

FIG. 13 shows the required maximum temperature within the reactor system of the invention as a function of the pressure; and FIG. 14 is a graph of the approach to equilibrium ($\Delta T_{app, SMR}$) of the steam methane reforming reaction for different gas flow rates over a structured catalyst.

DETAILED DESCRIPTION OF THE FIGURES

Throughout the Figures, like reference numbers denote like elements.

Figure 1A:
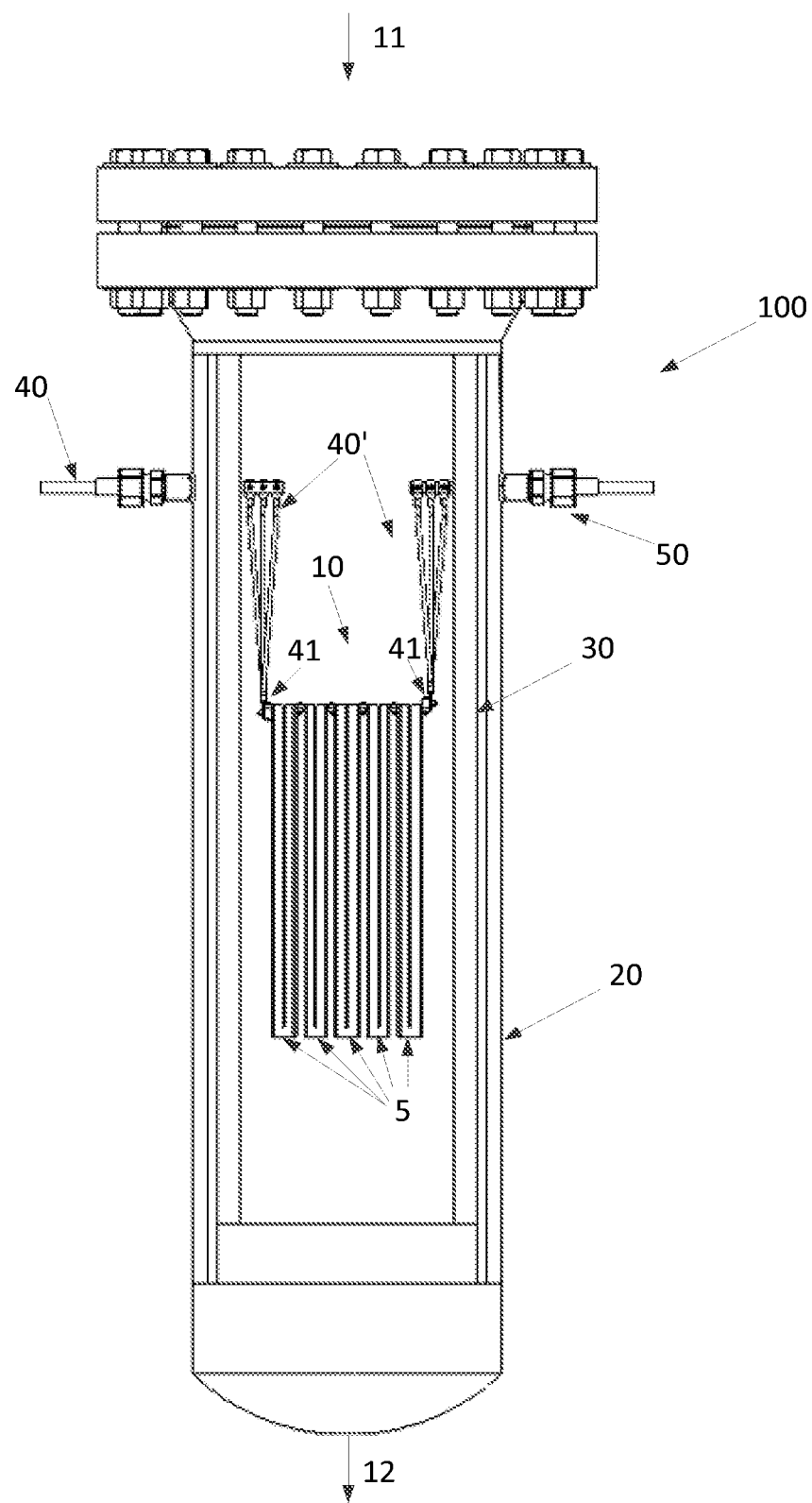
FIG. 1a shows a cross section through an embodiment of the inventive reactor system with a structured catalyst comprising an array of macroscopic structures, in a cross section.

FIG. 1a shows a cross section through an embodiment of a reactor system 100 according to the invention. The reactor system 100 comprises a structured catalyst 10, arranged as an array of macroscopic structures 5. Each macroscopic structure 5 in the array is coated with a ceramic coating impregnated with catalytically active material. The reactor system 100 moreover comprises conductors 40, 40' connected to a power supply (not shown in the Figures) and to the structured catalyst 10, viz. the array of macroscopic structures. The conductors 40, 40' are led through the wall of a pressure shell 20 housing the structured catalyst and through insulating material 30 on the inner side of the pressure shell, via fittings 50. The conductors 40' are connected to the array of macroscopic structures 5 by conductor contact rails 41.

In an embodiment, the electrical power supply supplies a voltage of 70V and a current of 800 A. In another embodiment, the electrical power supply supplies a voltage of 170V and a current of 2000 A. The current is led through electrical conductors 40, 40' to conductor contact rails 41, and the current runs through the structured catalyst 10 from one conductor contact rail 41, e.g. from the conductor contact rail seen to the left in FIG. 1a, to the other conductor contact rail 41, e.g. the conductor contact rail seen to the right in FIG. 1a. The current can be both alternating current, and e.g. run alternating in both directions, or direct current and run in any of the two directions.

The macroscopic structures 5 are made of electrically conductive material. Especially preferred is the alloy kanthal consisting of aluminum, iron and chrome. The ceramic coating, e.g. an oxide, coated onto the structure catalysts 5 is impregnated with catalytically active material. The conductors 40, 40' are made in materials like iron, aluminum, nickel, copper, or alloys thereof.

During operating, a feed gas enters the reactor system 100 from above as indicated by the arrow 11 and exits the reactor system from the bottom thereof as indicated by the arrow 12.

Figure 1B:
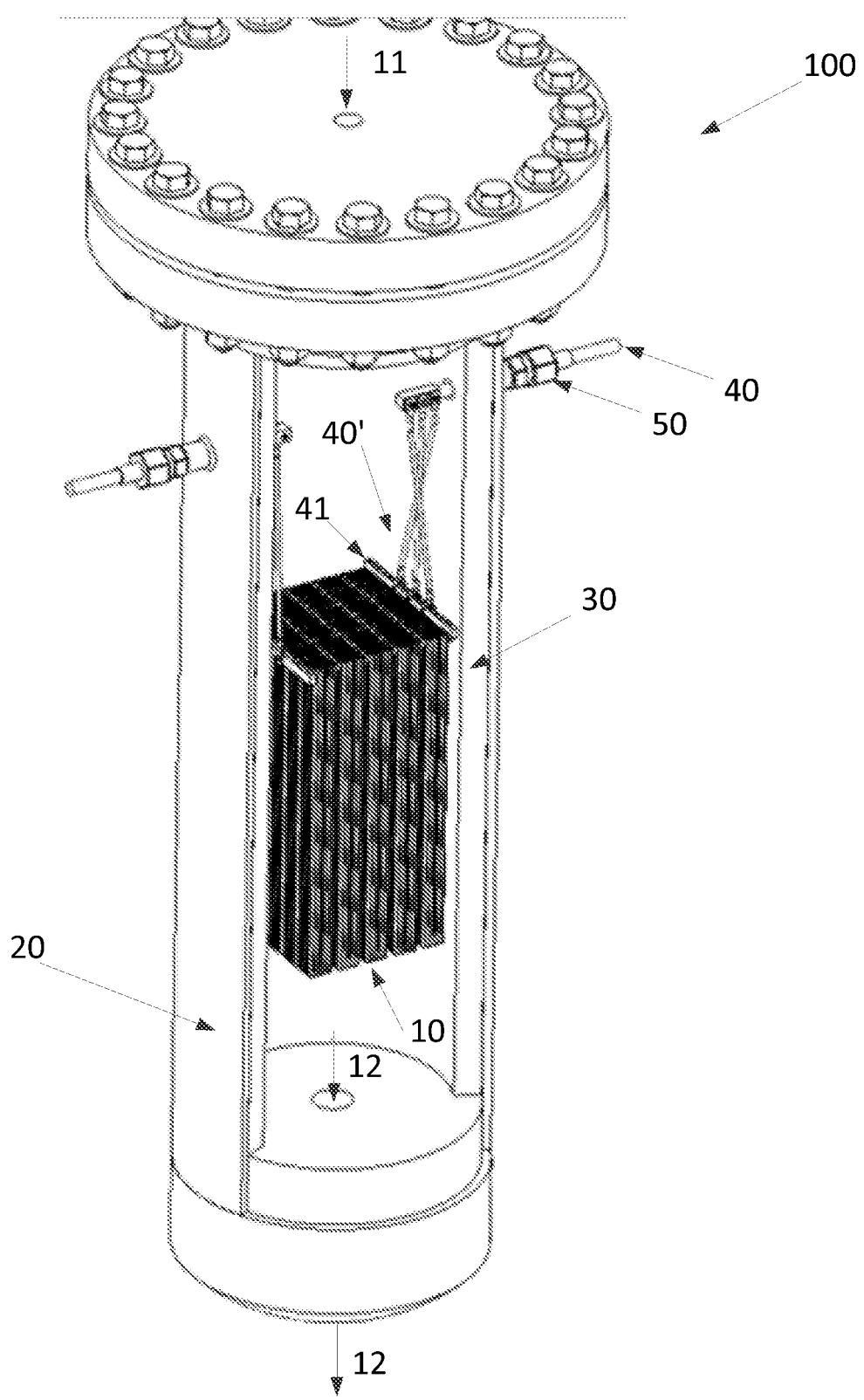
FIG. 1b shows the reactor system of FIG. 1a with a part of the pressure shell and heat insulation layer removed.
Figure 2:
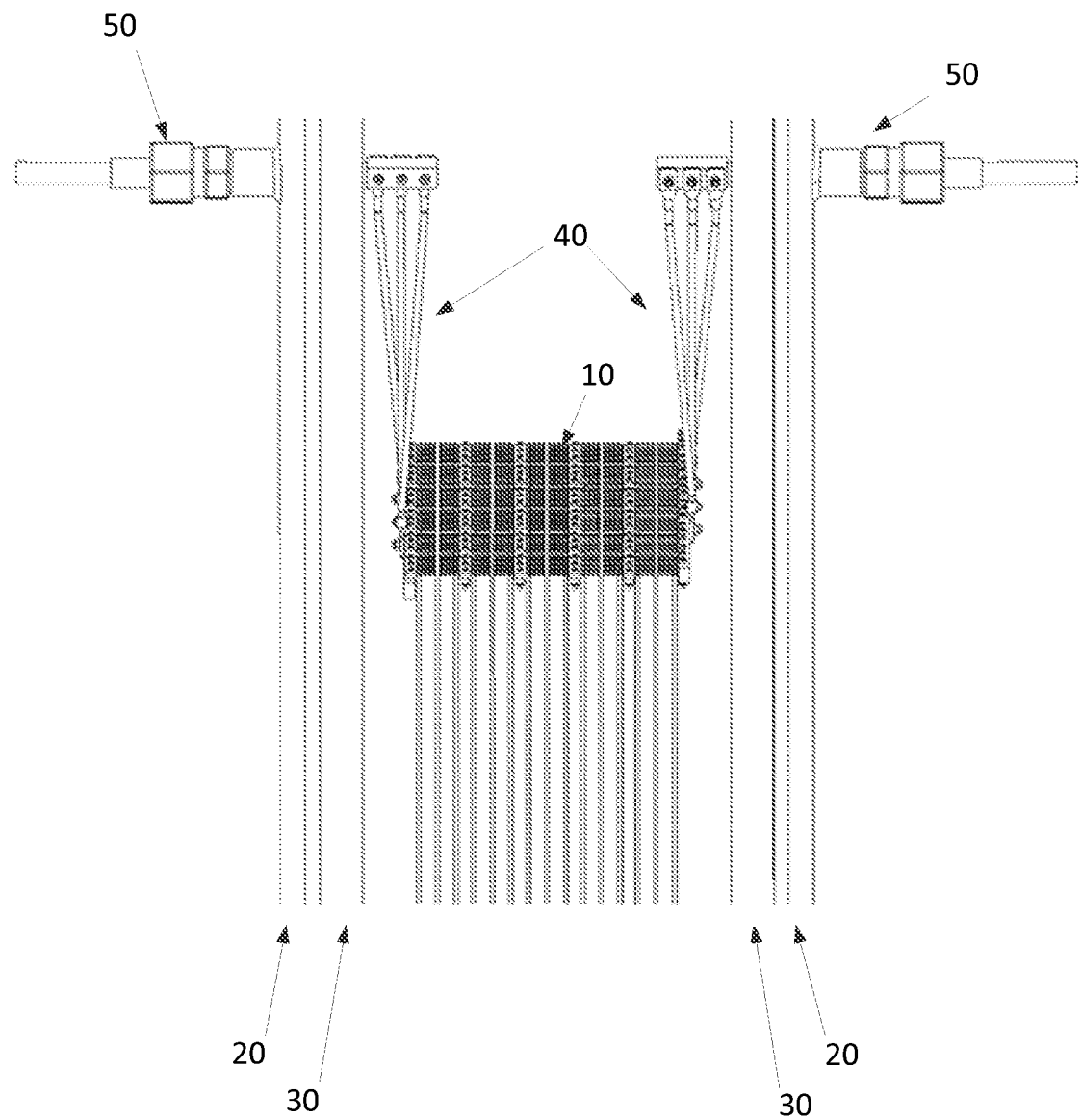
FIG. 2 is an enlarged view of a part of the reactor system.

FIG. 1b shows the reactor system 100 of FIG. 1a with a part of the pressure shell 20 and heat insulation 30 layer removed and FIG. 2 is an enlarged view of a part of the reactor system 100. In FIGS. 1b and 2 the connections between conductors 40' and conductor contact rails 41 are shown more clearly than in FIG. 1a. Moreover, it is seen that the conductors 40 are led through the walls of the pressure shell in a fitting 50, and that the one conductor 40 is split up into three conductors 40' within the pressure shell. It should be noted, that the number of conductors 40' may be any appropriate number, such as smaller than three or even larger than three.

In the reactor system shown in FIGS. 1a, 1b and 2, the conductors 40, 40' are led through the wall of a pressure shell 20 housing the structured catalysts and through insulating material 30 on the inner side of the pressure shell, via fittings 50. Feed gas for steam reforming is inlet into the reactor system 100 via an inlet in the upper side of the reactor system 100 as shown by the arrow 11, and reformed gas exists the reactor system 100 via an outlet in the bottom of the reactor system 100 as shown by the arrow 12. Moreover, one or more additional inlets (not shown in FIGS. 1a to 2) advantageously exist close to or in combination with the fittings 50. Such additional inlets allow a cooling gas to flow over, around, close to, or inside at least one conductor within the pressure shell to reduce the heating of the fitting. The cooling gas could e.g. be hydrogen, nitrogen, steam, carbon dioxide, or mixtures thereof. The temperature of the cooling gas at entry into the pressure shell may be e.g. about 100° C.

In the reactor system 100 shown in FIGS. 1a to 2, inert material (not shown in FIGS. 1a-2) is advantageously present between the lower side of the structured catalyst 10 and the bottom of the pressure shell. Moreover, inert material is advantageously present between the outer sides of the structured catalyst 10 of macroscopic structures 5 and the insulating material 30. Thus, one side of the insulating material 30 faces the inner side of the pressure shell 20 and the other side of the insulating material 30 faces the inert material. The inert materiel is e.g. ceramic material and may be in the form of pellets. The inert material assists in controlling the pressure drop across the reactor system 100 and in controlling the flow of the gas through the reactor system 100, so that the gas flows over the surfaces of the structured catalyst 10.

Figure 3A:
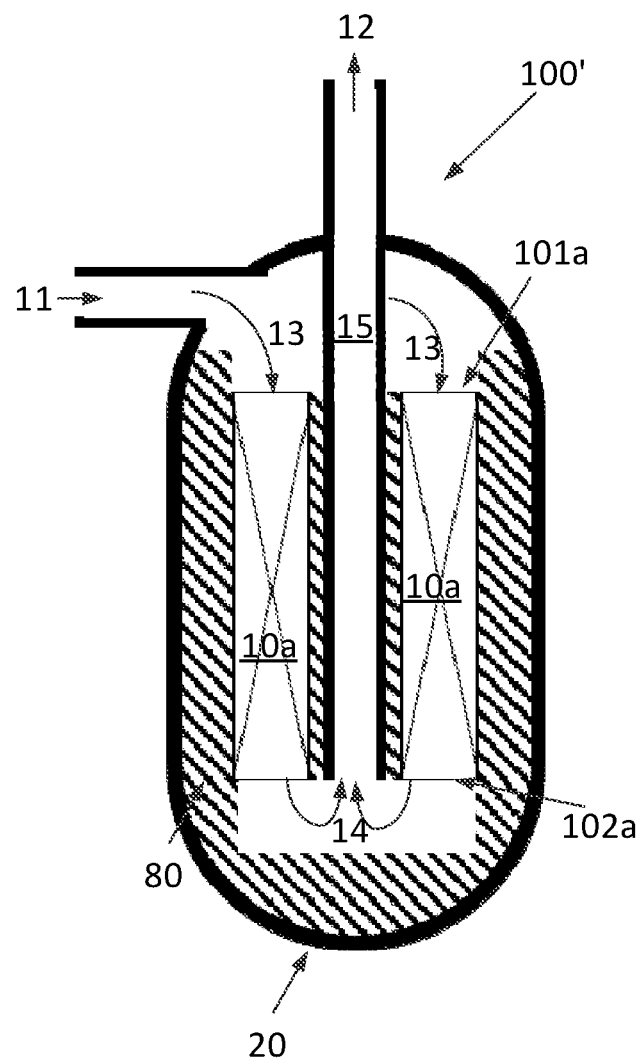
FIGS. 3a and 3b show schematic cross sections through an embodiment of the inventive reactor system comprising a structured catalyst.
Figure 3B:
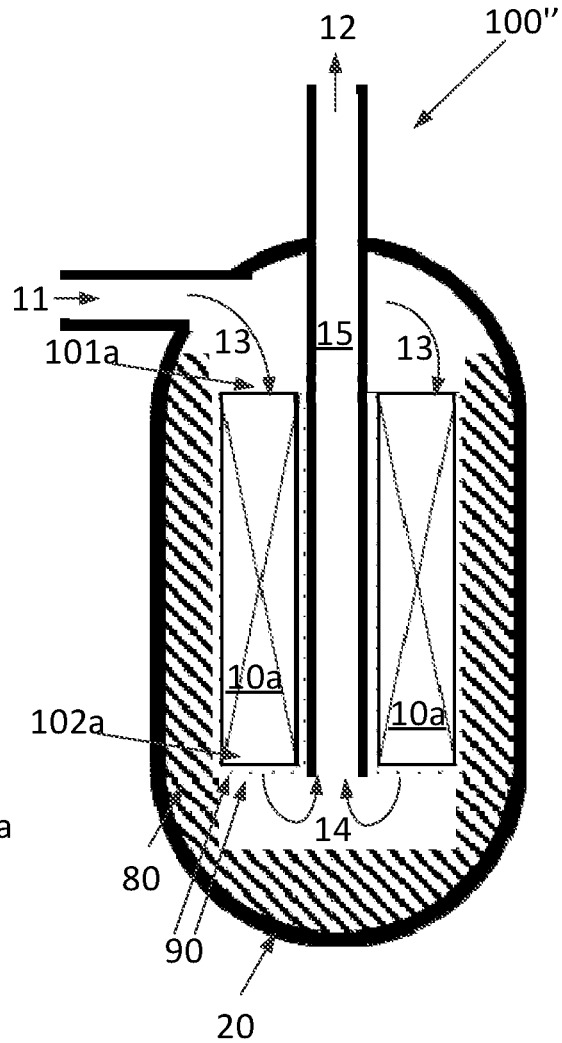

FIGS. 3a and 3b show schematic cross sections through an embodiment of the inventive reactor system 100', 100" comprising a structured catalyst 10a. The structured catalyst 10a may consist of a single macroscopic structure with ceramic coating supporting catalytically active material or it may contain two or more macroscopic structures. Each of the reactor systems 100', 100" comprises a pressure shell 20 and a heat insulation layer 80 between the structured catalyst 10a and the pressure shell 20. In FIGS. 3a and 3b, the inert material 90 is indicated by hatching. Inert material 90 can be used to fill the gap between the structured catalyst 10a and the heat insulation layer or the pressure shell 20. In FIGS. 3a and 3b, the inert material 90 is indicated by dotted area; the inert material 90 may be in any appropriate form, e.g. in the form of inert pellets, and it is e.g. of ceramic material. The inert material 90 assists in controlling the pressure drop through the reactor system and in controlling the flow of the gas through the reactor system. Moreover, the inert material typically has a heat insulating effect.

From FIGS. 3a and 3b it is seen that the reactor systems 100', 100" further comprise an inner tube 15 in heat exchange relationship with the structured catalyst 10a. The inner tube 15 is adapted to withdraw a product gas from the structured catalyst 10a so that the product gas flowing through the inner tube or tubes is in heat exchange relationship with the gas flowing through the structured catalyst; however, the inner tube 15 is electrically insulated from the structured catalyst 10a by either heat insulation 80, inert material 90, a gap, or a combination. This is a layout which is denoted a bayonet reactor system. In this layout the product gas within the inner tube assists in heating the process gas flowing over the macroscopic structure. In the layouts shown in FIGS. 3a and 3b, the feed gas enters the reactor system 100', 100" through an inlet as indicated by the arrow 11, and enters into the structured catalyst 10a at a first end 101a thereof, as indicated by the arrows 13. During the passage of the feed gas through the structured catalyst 10a, it undergoes the steam reforming reaction. The gas exiting from a second end 102a of the structured catalyst 10a is at least partly reformed. The at least partly reformed gas flows exiting from the second end 102a of the structured catalyst 10a enters into the inner tube 15 as indicated by the arrows 14, and exits the inner tube through an outlet of the pressure shell, as indicated by the arrows 12. Even though the inert material 80 is present between the inner tube 15 and the structured catalyst 10a, some heat transfer will take place from the gas within the inner tube 15 and the gas within the structured catalyst 10a or upstream the structured catalyst 10a. In the embodiments shown in FIGS. 3a and 3b, the feed gas flow downwards through the structured catalyst 10a, from a first end 101a of the structured catalyst towards a second end 102a thereof, and subsequently upwards through the inner tube 15; however, it is conceivable that the configuration was turned upside-down so that the feed gas would flow upwards through the structured catalyst 10a and downwards through the inner tube 15. In this case, the lower end of the structured catalyst would be the first end, and the upper end of the structured catalyst would be the second end.

Figure 4:
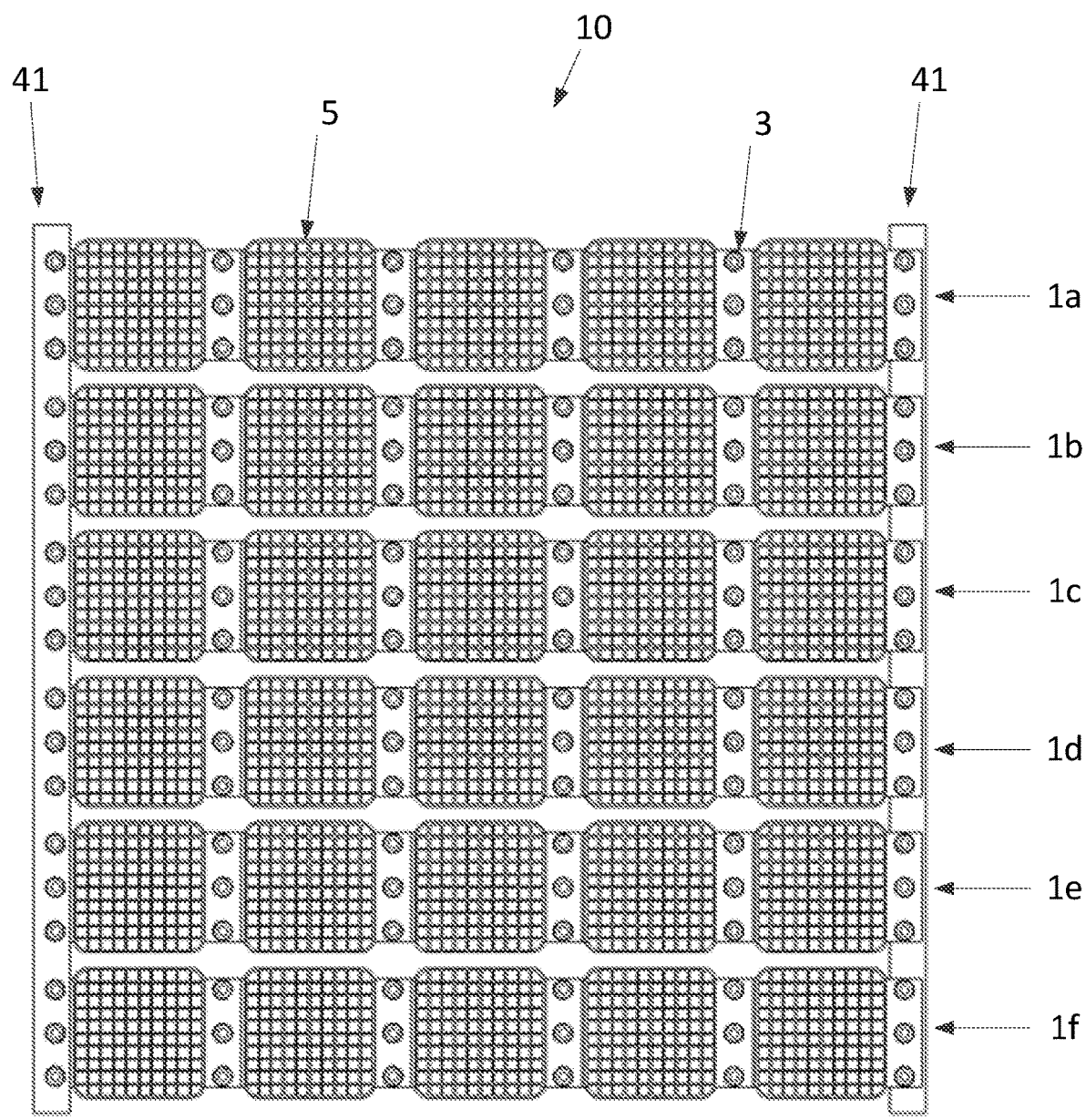
FIGS. 4 and 5 show an embodiment of a structured catalyst with an array of macroscopic structures as seen from above and from the side, respectively.
Figure 5:
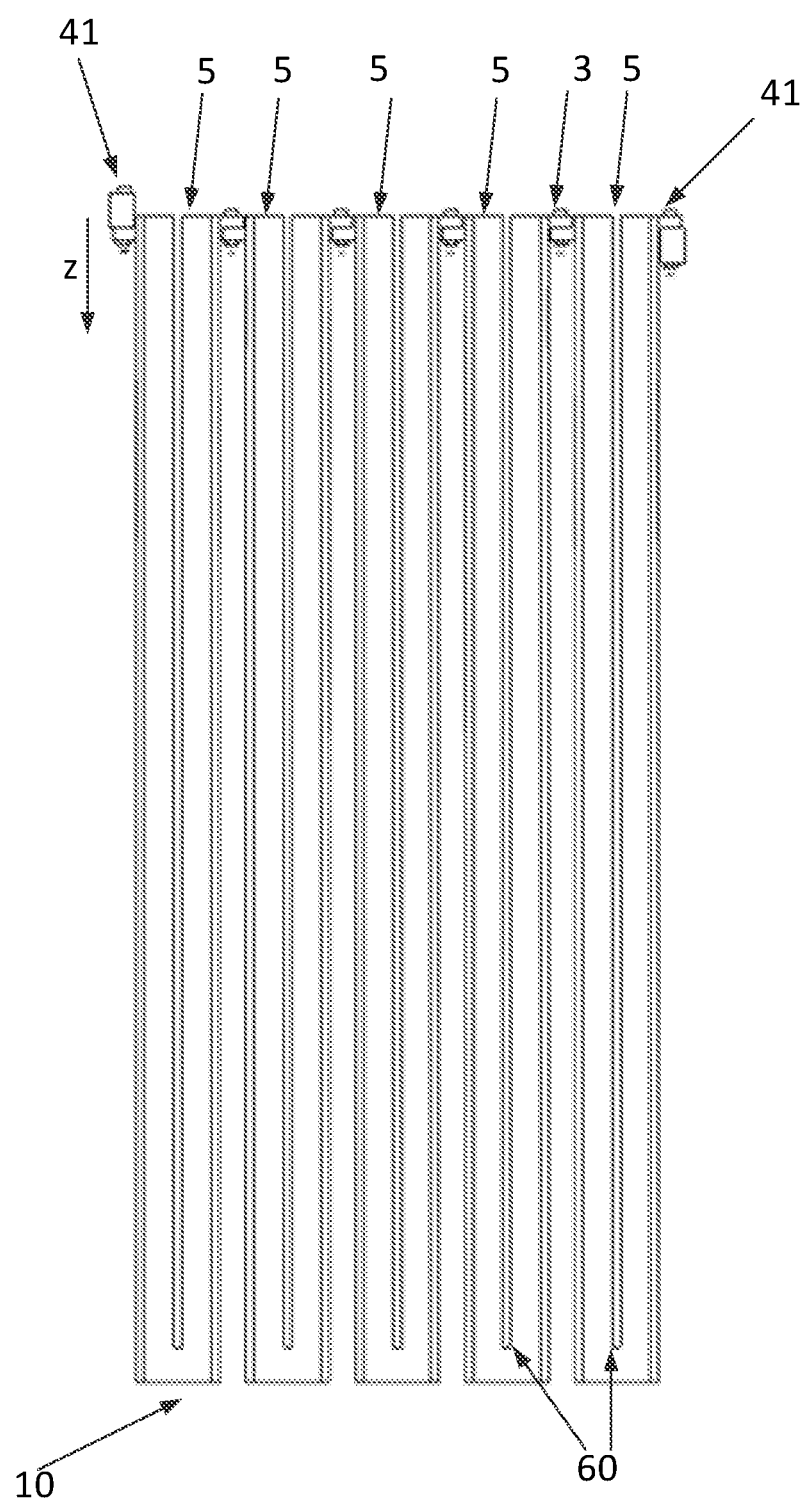

FIGS. 4 and 5 show an embodiment of a structured catalyst comprising an array of macroscopic structures as seen from above and from the side, respectively. FIG. 4 shows a structured catalyst 10 comprising an array of macroscopic structure 5 seen from above, viz. as seen from the arrow 11 in FIGS. 1a and 1b. The array has 6 rows, viz. 1a, 1b, 1c, 1d, 1e, and 1f, of five macroscopic structures 5. The macroscopic structures 5 in each row are connected to its neighboring macroscopic structure (s) in the same row and the two outermost macroscopic structures in each row are connected to a conductor contact rail 41. The neighboring macroscopic structure 5 in a row of macroscopic structures are connected to each other by means of a connection piece 3.

FIG. 5 shows the structured catalyst 10 having an array of macroscopic structures 5 of FIG. 4 seen from the side. From FIG. 5, it can be seen that each macroscopic structure 5 extends longitudinally perpendicular to the cross section seen in FIG. 4. Each macroscopic structure 5 has a slit 60 cut into it along its longitudinal direction (see FIG. 5). Therefore, when energized by the power source, the current enters the array of macroscopic structures 5 via a conductor contact rail 41, is led through the first macroscopic structure 5 downwards until the lower limit of the slit 60 and is subsequently led upwards towards a connection piece 3. The current is led via a corresponding zigzag path, downwards and upwards, through each macroscopic structure 5 in each row 1a-1f of macroscopic structures 5 in the array 10. This configuration advantageously increases the resistance over the structured catalyst 10.

Figure 6:
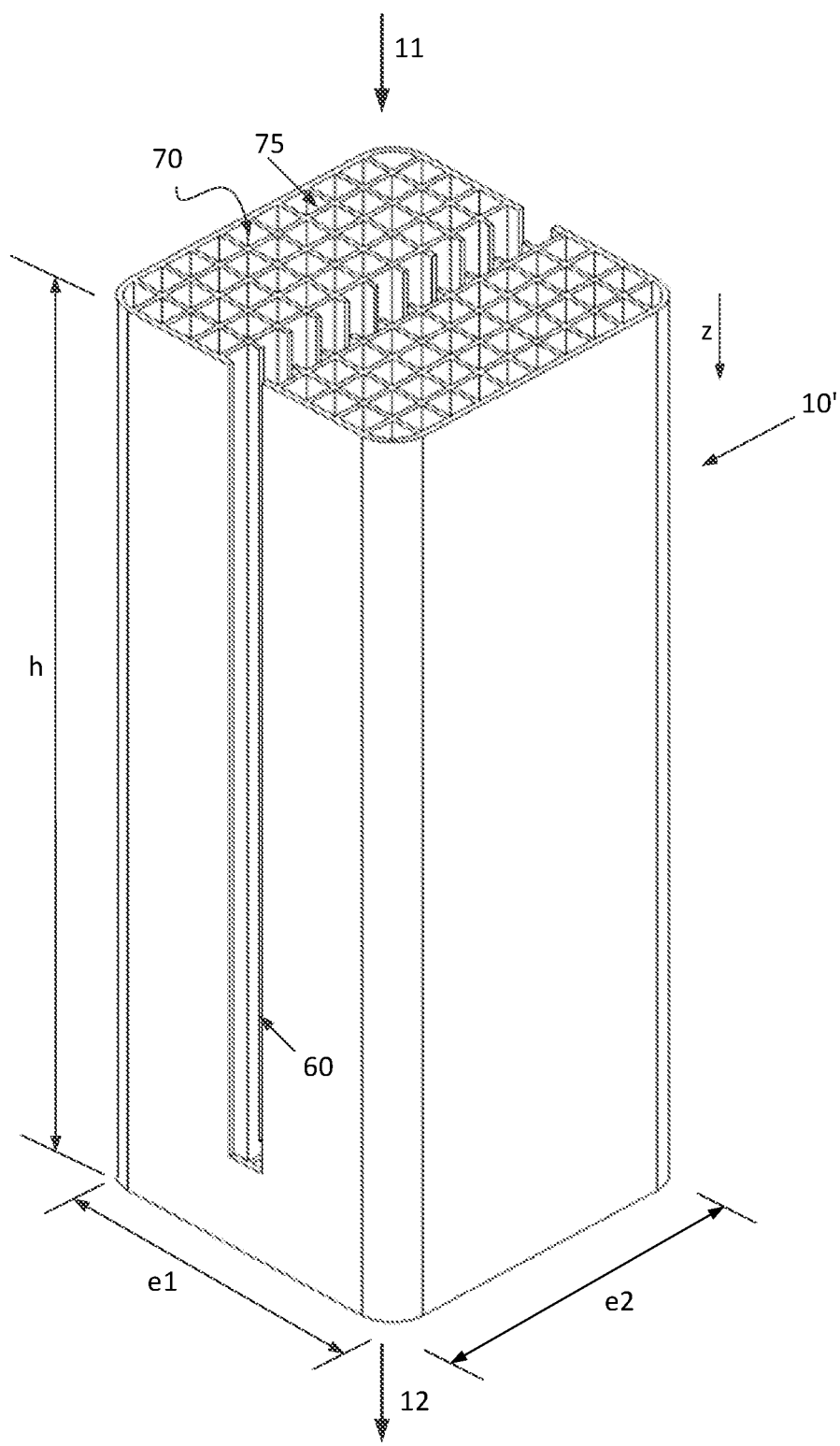
FIG. 6 shows an embodiment of the structured catalyst used in the reactor system of the invention.

FIG. 6 shows a structured catalyst 10' according to the invention in a perspective view. The structured catalyst 10' comprises a macroscopic structure that is coated with a ceramic coating impregnated with catalytically active material. Within the structured catalyst are channels 70 extending along the longitudinal direction (shown by the arrow indicate 'h' in FIG. 6) of the macroscopic structure 5; the channels are defined by walls 75. In the embodiment shown in FIG. 6, the walls 75 define a number of parallel, square channels 70 when seen from the direction of flow as indicated by the arrow 12. The structured catalyst 10' has a substantially square perimeter when seen from above, defined by the edge lengths e1 and e2. However, the perimeter could also be circular or another shape.

The walls 75 of the structured catalyst 10' are of extruded material coated with a ceramic coating, e.g. an oxide, which has been coated onto the macroscopic structure. In the Figures, the ceramic coating is not shown. The ceramic coating is impregnated with catalytically active material. The ceramic coating and thus the catalytically active material are present on every walls within the structured catalyst 10' over which the gas flow flows during operation and interacts with the heated surface of the structured catalyst and the catalytically active material.

Thus, during use in a reactor system for steam reforming, a hydrocarbon feed gas flows through the channels 70 and interacts with the heated surface of the structured catalyst and with the catalytically active material supported by the ceramic coating.

In the structured catalyst 10' shown in FIG. 6 a slit 60 has been cut into the structured catalyst 10'. This slit 60 forces a current to take a zigzag route, in this instance downwards and subsequently upwards, within the macroscopic structure thereby increasing the current path and thus the resistance and consequently the heat dissipated within the macroscopic structure. The slit 60 within the macroscopic structure may be provided with embedded insulating material in order to ensure that no current flows in the transverse direction of the slit 60.

The channels 70 in the structured catalyst 5 are open in both ends. In use of the structured catalyst in a reactor system, a hydrocarbon feed gas flows through the unit, in the direction shown by arrows 11 and 12 in FIGS. 1*a* and 1*b*, and gets heated via contact with the walls 75 of the channels 70 and by heat radiation. The heat initiates the desired steam reforming process. The walls 75 of the channels 70 may e.g. have a thickness of 0.5 mm, and the ceramic coating coated onto the walls 75 may e.g. have a thickness of 0.1 mm. Even though the arrows 11 and 12 (see FIGS. 1*a* and 1*b*) indicate that the flow of the hydrocarbon feed gas is down-flow, the opposite flow direction, viz. an up-flow, is also conceivable.

FIG. 7 shows the structured catalyst 5 of FIGS. 1*a* and 1*b* in a perspective view and with connectors 7 attached. The connectors 7 each connects a part of the structured catalyst 10' to a conductor 40. The conductors 40 are both connected to a power supply (not shown). Each of the connectors 7 are connected to an upper part of the structured catalyst. When the conductors 40 are connected to a power supply, an electrical current is led to the corresponding connector 7 via the conductor and runs through the structured catalyst 10'. The slit 60 hinders the current flow in a transverse direction (horizontal direction of FIG. 7) throughout its lengths along the height h of the structured catalyst 10'. Therefore, the current runs in a direction downwards as seen in FIG. 7 in the part of the structured catalyst along the slit 60, subsequently it runs transversely to the longitudinal direction below the slit 60 as seen in FIG. 7 and finally the current runs upwards in the longitudinal direction of the structured catalyst to the other connector 7. The connectors 7 in FIG. 7 are mechanically fastened to the structured catalyst by means of i.a. mechanical fastening means such as screws and bolts. However, additional or alternative fastening means are conceivable. In an embodiment, the electrical power supply generates a voltage of 3V and a current of 400 A.

The connectors 7 are e.g. made in materials like iron, aluminum, nickel, copper, or alloys thereof.

As mentioned, the structured catalyst 10' is coated with a ceramic coating, such as an oxide, supporting the catalytically active material. However, the parts of the structured catalyst 10' which are connected to the connectors 7 should not be coated with an oxide. Instead, the macroscopic structure of the structured catalyst should be exposed or connected directly to the connectors 7 in order to obtain a good electrical connection between the macroscopic structure and the connector.

When the connectors 7 and thus the conductors 40 are connected to the same end of the structured catalyst 5, viz. the upper end as seen in FIG. 7, the gas entering into a reactor system housing the structured catalyst 10' would be able to cool the connectors 7 and the conductors 40. For instance, the hydrocarbon gas entering into such a reactor system would have a temperature of 400° C. or 500° C. and would thus keep the connectors 7 and conductors 40 from reaching temperatures much higher than this temperature.

FIG. 8 shows another embodiment of a structured catalyst 10' with connectors 7'''. The structured catalyst 10' is e.g. the structured catalyst as shown in FIG. 6. Each of the connectors 7''' has three holes at an upper side thereof for connection to conductors (not shown). A piece of electrically insulating material 61 is inside the slit 60 (see FIG. 6) of the structured catalyst 10'.

FIG. 9*a* shows an embodiment of a structured catalyst 10" for use in the reactor system of the invention. FIG. 9*a* shows the structured catalyst 10" in a perspective view. It can be seen that the structured catalyst 10" has a single vertical slit 60 along the longitudinal axis of the catalyst 10" as shown in FIG. 9*a*. The single vertical slit 60 extends from the top of the structured catalyst 10" towards the bottom thereof, along about 90% of the length of the structured catalyst. The single vertical slit 60 can be seen as parting the structured catalyst 10" into two halves. Each of these two halves has five horizontal slits 65. The vertical slit 60 and the horizontal slits 65 function to direct the current in a zig-zag route through the structured catalyst.

FIG. 9*b* shows the current density of the structured catalyst 10" shown in FIG. 9*a* as a function of the electrical effect transferred to the structured catalyst 10". FIG. 9*b* is the result of a multiphysics computational fluid dynamics simulations in Comsol software of the current distribution of the structure in FIG. 9*a*. In FIG. 9*b* the structured catalyst 10" is seen from the side. Two conductors (not shown in FIG. 9*b*) are connected to the upper end on the left side of the structured catalyst 10". As illustrated by the intensity of the current density, as depicted on the scale in the right part of FIG. 9*b*, when a power source is connected to the structured catalyst 10", a current runs from the upper end thereof in zig-zag form, due to the horizontal slits, to the bottom of the structure catalyst 10", to the back thereof, viz. into the paper as seen in FIG. 9*b*, and subsequently upwards in zig-zag form towards the second conductor. The temperature of the structured catalyst 10" depends upon the current density throughout the structured catalyst 10". It can be seen in FIG. 9*b*, that the current density is highest at the end points of horizontal slits 65 into the structured catalyst 10". These points are the points where the current path turns direction, i.e. where the current through the structured catalyst 10" is forced or directed in another direction. Moreover, it can be deduced that the current density vector of the principal current path has a non-zero component value parallel to the length of said structured catalyst for more than 80% of the structure. In conclusion, it is clear from FIG. 9*b* that the principal current path can be controlled in the structured catalyst. This feature gives control of the temperature profile inside the structured catalyst.

FIG. 10 a schematic drawing of a cross-section through structured catalyst with electrically insulating parts. FIG. 10 is a schematic drawing of a cross-section through a structured catalyst 10''' of the invention, with electrically insulating parts 61'. The electrically insulating parts are shown as hatched parts in FIG. 10. In the embodiment shown in FIG. 10, three pieces of electrically insulating parts 61' intersects the structured catalyst 10''' in most of the longitudinal direction thereof. Conductors 7 are connected to the upper side of the structured catalyst 10''' as seen in FIG. 10. During use of the structured catalyst 10''', the conductors 7 are connected to a power supply and a hydrocarbon feed gas is brought into contact with the structured catalyst 10'''. Thus, current runs from the first conductor through the structured catalyst 10''' in a zigzag direction, viz. downwards from the first conductor and around the lower side of the first electrically insulating part 61', subsequently upwards and around the upper side of the middle electrically insulating part 61', then downwards again and around the lower side of the third electrically insulating part 61' and finally upwards to the second conductor 7. It should be noted that any appropriate number of electrically insulating parts 61' is conceivable. The electrically insulating parts 61' are solid, electrically insulating material, e.g. glass, and they are provided in cuts or slits in the macroscopic structure. The electrically insulating parts 61' ensures that the parts of the macroscopic structure on the sides electrically insulating parts 61' are kept from each other. It should be noted, that in this embodiment, as in all the embodiments of the invention, the direction of flow of gas may be the same as the direction of the current through the structured catalyst, or it may be different. In the embodiment of FIG. 10, the direction of flow of gas is e.g. from the upper side of the structured catalyst 10''' towards the bottom of the structured catalyst 10'''; thus, the flow of current only the same as the direction of the flow of gas as some parts of the structured catalyst 10''', whilst the direction of the current is transverse to the direction of the flow of gas at some parts and opposite (upwards) in some parts.

FIGS. 11a and 11b shows temperature and conversion profiles as a function of electrical effect transferred to the structured catalyst. FIG. 11a is the result of a laboratory test of bench scale reactor system having a length of 12 cm and a volume 108 cm$^3$ of the structured catalyst as defined by the outer walls/sides thereof and configuration as depicted in FIG. 6 where Cu conductors has been welded to the first 2 cm of the monolith on opposing sides in the first end. The pressure of the pressure shell was 3.5 bar, the temperature of the feed gas inlet into the reactor system was about 200° C. The composition of the feed gas was 31.8% $CH_4$, 2.4% $H_2$, 65.8% $H_2O$ and the total gas flow was 102.2 Nl/h. It should be noted, that the energy balance is substantially better in a larger scale than in the small scale experimental conditions behind the graphs of FIG. 11a, due to high energy loss in this relative small scale. However, it is clear from FIG. 11a that with increasing power, both the conversion of methane and the temperature increases. The temperature reaches above 900° C. and the methane convercion reaches above 98%.

FIG. 11b shows a similar experiment as described above, but with a pressure of 21 bar. Again, it is clear from FIG. 11b that with increasing power, both the conversion of methane and the temperature increases. The temperature reaches above 1060° C. and the methane conversion reaches above 95%.

FIGS. 12a and 12b show simulation results for temperatures and gas composition along the length of structured catalyst. A single channel of a structured catalyst is simulated. The length of the structured catalyst of this simulation, and thus of the single channel, is 10 cm. The conditions within the pressure shell/structured catalyst/channel is:
  Pressure: 29 barg
  T inlet: 466° C.
  Total flow: 30 Nl/h
  Composition of the feed gas inlet into the reactor/channel:
    31.8% methane,
    8.8% hydrogen, 2.3% carbon dioxide, and 57.1% steam.

In FIG. 12a, the temperature of the wall of the channel is indicated by Tw and the temperature in the center of the channel is indicated by Tc. Tw and Tc are read from the scale to the right of the graphs. The methane conversion is indicated by Cc and is read from the scale to the left of the graphs.

From FIG. 12a it is seen that the temperature of the wall of a channel in the structured catalyst increases continuously along almost all of the length of the structured catalyst. The temperature is about 480° C. at the first end of the structured catalyst (z=0 cm) and about 1020° C. at the second end of the structured catalyst (z=10 cm). The increase of temperature is steepest the first 10% of the structured catalyst, and only in the last few percent of the length of the structured catalyst, the temperature does not change much. Thus, when the current turns around at the second end of the structured catalyst, from going downwards to upwards in the FIGS. 1-9a, the temperature of the walls of the channels of the structured catalyst does not change substantially for increasing z-values. However, FIG. 12a also shows that the temperature in the center of the channel keeps on increasing along the whole length of the structured catalyst. It should be noted, though, that the temperature in the center of the channel remains substantially constant for the first 5-7% of the length of the structured catalyst. This is due to the fact that the gas inlet into the structured catalyst cools the structured catalyst in the vicinity of the first end thereof and due to thermal energy transport delay from the wall to the center of the channel.

In FIG. 12a, the conversion of methane in the center of the channel of the structured catalyst is also shown. It can be seen that the conversion is close to zero for the first 10-12% of the length of the channel, and that the conversion subsequently increases monotonously and reaches a value of about 85%. As noted above, small scale reactors and simulations thereof provide for less than optimal numbers, and that considerably higher conversion is achievable in a real scale reactor system. However, the simulation provides information on the tendencies of the conversion rate and temperature throughout the structured catalyst.

FIG. 12b shows the partial pressures of the principle active gasses within the channel of the structured catalyst of FIG. 12a. From FIG. 12b it is clear that the partial pressures of steam and methane diminish considerably along the length of the channel of the structured catalyst, whilst the partial pressures of hydrogen and carbon monoxide increase considerably. Moreover, the partial pressure of carbon dioxide increases slightly along the length of the structured catalyst, but decreases towards the highest temperatures where the reverse water gas shift reaction is thermodynamically favored.

FIG. 13 shows the required maximum temperature within the reactor system of the invention as a function of the pressure for pressures of about 30 bar to about 170 bar during steam reforming of a feed gas consisting of 30.08% $CH_4$, 69.18% $H_2O$, 0.09% $H_2$, 0.45% $CO_2$, 0.03% Ar, 0.02% CO, 0.15% $N_2$ to a methane conversion of 88% at a 10° C. approach to the steam methane reforming equilibrium. The required maximum temperature increases with pressure due to Le Chatelier's principle. This shows that the high temperatures which can be used in the current invention allows for using pressures which are significantly higher than the pressures used in a traditional SMR, where the external heating of the tubes prohibit the temperature exceeding ca. 950° C. A temperature of 950° C. corresponds to 27 barg in FIG. 13. In a reactor system of the invention, a maximum temperature of e.g. 1150° C. can be used which allows for a pressure of up to 146 barg with the same conversion of methane as indicated above.

FIG. 14 is a graph of the approach to equilibrium ($\Delta T_{app, SMR}$) of the steam methane reforming reaction for different gas flow rates through the structured catalyst. FIG. 14 shows that for a given gas flow rate through the structured catalyst, the approach to equilibrium at the entry into a reactor system housing the structured catalyst, is in the range 160-175° C., because the feed gas is far from equilibrium. When the hydrocarbon gas flows through the structured catalyst, the approach to equilibrium is reduced due to the catalytic reactions. FIG. 14 shows the approach to equilibrium ($\Delta T_{app, SMR}$) for gas flow rates from 10000 Nm$^3$/h to 200000 Nm$^3$/h. For the lowest gas flow rate, 10000 Nm$^3$/h, the approach to equilibrium becomes less than 10° C. at about 13% of the reactor system length. Here, the reactor system length is seen as outer height of the structured catalyst in the direction of the flow, so that the reactor system length of the structured catalyst 10 is about 1 h in the embodiment of FIG. 6. For higher gas flow rates, the approach to equilibrium is higher the higher the gas flow rate, so that for a gas flow rate of 200000 Nm$^3$/h, the approach to equilibrium reaches a minimum value just below 80° C.

A general trend in all the curves in the FIG. 14 is that the approach to equilibrium is continuously decreasing from the entry into the structured catalyst until a pseudo equilibrium is reached, where the heat added and the heat consumed roughly equal each other. The approach to equilibrium from this stage is substantially constant or has a slightly increasing development due to the overall increasing temperature of the reactor system. For e.g. the flow rate 150 000 Nm$^3$/h, the approach to equilibrium goes below 60° C. at about 80% of the reactor system length, but subsequently increases to about 60° C.

It should be noted, that even though the structured catalysts shown in the figures are shown as having channels with a square cross section, as seen perpendicular to the z axis, any appropriate shape of the cross sections of the channels is conceivable. Thus, the channels of the structured catalyst could alternatively be e.g. triangular, hexagonal, octagonal, or circular, where triangular, square, and hexagonal shapes are preferred.

EXAMPLES

While the invention has been illustrated by a description of various embodiments and examples while these embodiments and examples have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

All the examples described below relate to compact reactor systems. This is possible due to the reactor systems comprise compact structured catalysts in the form of compact macroscopic supports having a high thermal flux when powered by a power source. It is moreover to be noted, that the dimensions of the structured catalysts may be chosen relatively freely, so that the structured catalyst may be almost cubic in outer shape or it may be wider than its height.

The examples all describe operation conditions with high pressure, ranging from 28 bar to 182 bar. Such high pressures are made possible by the configuration of the reactor system since the structured catalyst within the reactor system has high thermal flux upon powering by a power source, is to some extent thermally insulated from the pressure shell, and the pressure drop through the structured catalyst is very low compared to an SMR. The structured catalyst will obtain the highest temperature within the reactor system, while the pressure shell will have a significantly lower temperature due to the thermal insulation between the structured catalyst and the pressure shell. Ideally, the temperature of the pressure shell will not exceed 500° C. When product gas with a high pressure is needed, such as 30 bar or above, the product gas exiting the reactor system can in many cases be used directly, without the use of compressors. This is due to the possibility of pressurizing the feed gas upstream the reactor system of the invention. Pressurizing the feed gas will require less energy than the product gas as the volume of the feed is lower than the product gas as the steam reforming reaction has a net production of molecules. Additionally, one of the feed gas constituents may be pumped which requires significantly less energy compared to gas compression.

In all the examples described below, the feed gas enters the reactor system and flows through the structured catalyst housed therein. When the heat insulation layer of the reactor system is a heat insulating material, the heat insulating material typically makes up most of the space between the structured catalyst and the pressure shell along the walls of the pressure shell so that the feed gas is forced to flow along walls of the macroscopic structure on its way through the pressure shell.

The examples below (except for the comparative example) all relate to a reactor system with a structured catalyst. The structured catalysts described in these examples comprise one or more macroscopic structures. The one or more macroscopic structures of the examples below all support a ceramic coating supporting catalytically active material. Advantageously, substantially all the surface of the macroscopic structure supports the ceramic coating supporting the catalytically active material; however, at connections points, e.g. between two adjacent macroscopic structures or between a macroscopic structure and a conductor, the macroscopic structure may be free from ceramic coating in order to facilitate connection between a conductor and the macroscopic structure.

Example 1

An example calculation of the process of the invention is given in Table 1 below. A feed gas is fed to the reactor system of the invention. The feed gas entering the reactor system is pressurized to a pressure of 28 kg/cm$^2$·g and has a temperature of 500° C. Inside the reactor system, a structured catalyst with nine macroscopic structures having a square cross section are placed in an array and each macroscopic structure has a size of 0.53 times 0.53 times 2.3 meter. Each macroscopic structure additionally has 17778 channels with a square cross section having a side or edge length of 0.32 cm. Each macroscopic structure has slits parallel to the longitudinal direction thereof, so that clusters of 5 times 5 channels are formed. The clusters are individually insulated from the neighboring cluster, except from the ends, so that the current path through the macroscopic structure is a zigzag path. A current of 200 A and a voltage of ca. 5.5 kV are applied to each macroscopic structure in the reactor system of the invention in order to heat the structured catalyst and thus the gas passing through the structured catalyst, corresponding to a power supplied in the structured catalysts of 9899 kW.

The reactor system in the current configuration could have an overall internal diameter of the reactor system of 3.2 m and a total internal height of 5.5 m when the reactor system is made as a cylindrical reactor system with spherical heads. In this specific configuration, the macroscopic structures are placed in a square orientation having a diagonal length of 2.3 m. In all the examples described herein, except for the comparative example, inert material is placed around the structured catalyst to close the gap to the insulation material, adjacent to the pressure shell. The insulation material in example 1 has a cylindrical form with an internal diameter of 2.5 m and a thickness of 0.35 m.

During the passage of the feed gas through the reactor system, the feed gas is heated by the structured catalyst and undergoes steam reforming to a product gas having an exit temperature of 963° C.

TABLE 1

| Size of macroscopic structure: | |
|---|---|
| Edge size [m] | 0.53 |
| Height [m] | 2.3 |
| Number of macroscopic structures | 9 |
| Total volume of structured catalyst [L] | 5888 |
| Structured catalyst height/diagonal length [—] | 1.02 |

| | Feed gas | Product gas |
|---|---|---|
| T [° C.] | 500 | 963 |
| P [kg/cm$^2$ g] | 27.97 | 27.47 |
| CO2 [Nm$^3$/h] | 168 | 727 |
| N2 [Nm$^3$/h] | 26 | 26 |
| CH4 [Nm$^3$/h] | 2630 | 164 |
| H2 [Nm$^3$/h] | 590 | 8545 |
| CO [Nm$^3$/h] | 1 | 1907 |
| H2O [Nm$^3$/h] | 8046 | 5022 |
| Total flow [Nm$^3$/h] | 11461 | 16391 |
| $\Delta T_{app, SMR}$ [° C.] | | 10 |
| Power [kW] | 9899 | |
| Heat flux [kW/m$^2$] | 2.2 | |
| Space velocity [Nm$^3$/m$^3$/h] | 1950 | |

Example 2

An example calculation of the process of the invention is given in Table 2 below. A feed gas is fed to the reactor system of the invention. The feed gas entering the reactor system is pressurized to a pressure of 28 kg/cm$^2$·g and has a temperature of 500° C. Inside the reactor system, a structured catalyst in the form of 1 macroscopic structure having a square cross section is placed which has a size of 0.4 times 0.4 times 0.35 meter. The macroscopic structure additionally has 10000 channels with a square cross section having a side or edge length of 0.32 cm. The macroscopic structure has slits parallel to the longitudinal direction thereof, so that clusters of 5 times 5 channels are formed. The clusters are individually insulated from the neighboring cluster, except from the ends, so that the current path through the macroscopic structure is a zigzag path. A current of 200 A and a voltage of ca. 500 V are applied to the macroscopic structure in the reactor system of the invention in order to heat the structured catalyst and thus the gas passing through the structured catalyst, corresponding to a power deposited in the structured catalyst of 99 kW.

The reactor system in the current configuration could have an overall internal diameter of the reactor system of 1.2 m and a total internal height of 1.5 m when the reactor system is made as a cylindrical reactor system with spherical heads. In this specific configuration, the structured catalyst has a diagonal length of 0.6 m. Inert material is placed around the structured catalysts to close the gap to the insulation material which has an internal diameter of 0.6 m and a thickness of 0.3 m.

During the passage of the feed gas through the reactor system, the feed gas is heated by the structured catalyst and undergoes steam reforming to a product gas having an exit temperature of 963° C.

TABLE 2

| Size of macroscopic structure: | |
|---|---|
| Edge size [m] | 0.4 |
| Height [m] | 0.35 |
| Number of macroscopic structures | 1 |
| Total volume of structured catalyst [L] | 55.4 |
| Structured catalyst height/diagonal length [—] | 0.61 |

TABLE 2-continued

| | Feed gas | Product gas |
|---|---|---|
| T [° C.] | 500 | 963 |
| P [kg/cm$^2$ g] | 27.97 | 27.47 |
| CO2 [Nm$^3$/h] | 1.7 | 7.3 |
| N2 [Nm$^3$/h] | 0.3 | 0.3 |
| CH4 [Nm$^3$/h] | 26.3 | 1.6 |
| H2 [Nm$^3$/h] | 5.9 | 85.4 |
| CO [Nm$^3$/h] | 0 | 19.1 |
| H2O [Nm$^3$/h] | 80.5 | 50.2 |
| Total flow [Nm$^3$/h] | 114.7 | 163.9 |
| $\Delta T_{app, SMR}$ [° C.] | | 10 |
| Power [kW] | 99 | |
| Heat flux [kW/m$^2$] | 2.2 | |
| Space velocity [Nm$^3$/m$^3$/h] | 2071 | |

Example 3

An example calculation of the process of the invention is given in Table 3 below. A feed gas is fed to the reactor system of the invention. The feed gas entering the reactor system is pressurized to a pressure of 97 bar, viz. 97 kg/cm$^2$·g and has a temperature of 500° C.

Inside the reactor system, a structured catalyst comprising nine macroscopic structures having a square cross section are placed in an array and each macroscopic structure has a size of 0.53 times 0.53 times 2.3 meter. Each macroscopic structure additionally has 17778 channels with a square cross section having a side or edge length of 0.32 cm. Each macroscopic structure has slits parallel to the longitudinal direction thereof, so that clusters of 5 times 5 channels are formed. The clusters are individually insulated from the neighboring cluster, except from the ends so that the current path through the macroscopic structure is a zigzag path. A current of 200 A and a voltage of ca. 5.5 kV are applied to each macroscopic structure in the reactor system of the invention in order to heat the structured catalyst and thus the gas passing through the structured catalyst, corresponding to a power deposited in the structured catalyst of 9899 kW.

The reactor system in the current configuration could have an overall internal diameter of the reactor system of 3.2 m and a total internal height of 5.5 m when the reactor system is made as a cylindrical reactor system with spherical heads. In this specific configuration, the macroscopic structures are placed in a square orientation having a diagonal length of 2.3 m. Inert material is placed around the structured catalyst to close the gap to the insulation material which has an internal diameter of 2.5 m and a thickness of 0.35 m.

During the passage of the feed gas through the reactor system, the feed gas is heated by the structured catalyst and undergoes steam reforming to a product gas having an exit temperature of 1115° C. It is seen from Table 3 that the total flows of the feed gas and the product gas are lower in Example 3 compared to Example 1.

Since the product gas exiting the reactor system is pressurized to a pressure of 97 bar, no compressors will be needed downstream the reactor system when a high pressure product gas is requested. This reduces the overall cost of a plant with a reactor system of the invention.

TABLE 3

| Size of macroscopic structure: | |
|---|---|
| Edge size [m] | 0.53 |
| Height [m] | 2.3 |
| Number of macroscopic structures | 9 |

TABLE 3-continued

| | |
|---|---|
| Total volume of structured catalyst [L] | 5888 |
| Structured catalyst height/diagonal length [—] | 1.01 |

| | Feed gas | Product gas |
|---|---|---|
| T [° C.] | 500 | 1115 |
| P [kg/cm² g] | 96.97 | 96.47 |
| CO2 [Nm³/h] | 111 | 510 |
| N2 [Nm³/h] | 23 | 23 |
| CH4 [Nm³/h] | 2337 | 143 |
| H2 [Nm³/h] | 372 | 7354 |
| CO [Nm³/h] | 1 | 1796 |
| H2O [Nm³/h] | 7111 | 4518 |
| Total flow [Nm³/h] | 9955 | 14344 |
| $\Delta T_{app,\ SMR}$ [° C.] | | 10 |

| | |
|---|---|
| Power [kW] | 9899 |
| Heat flux [kW/m²] | 2.2 |
| Space velocity [Nm³/m³/h] | 1691 |

Example 4

An example calculation of the process of the invention is given in Table 3 below. A feed gas is fed to the reactor system of the invention. The feed gas entering the reactor system is pressurized to a pressure of 28 bar, viz. 28 kg/cm²·g and has a temperature of 500° C.

Inside the reactor system, a structured catalyst comprising 25 macroscopic structures having a square cross section are placed in an array and each macroscopic structure has a size of 0.24 times 0.24 times 0.9 meter. Each macroscopic structure additionally has 3600 channels with a square cross section having a side or edge length of 0.33 cm in length. Each macroscopic structure has slits parallel to the longitudinal direction thereof, so that clusters of 10 times 10 channels are formed. The clusters are individually insulated from the neighboring cluster, except from the ends, so that the current path through the macroscopic structure is a zigzag path. A current of 1500 A and a voltage of ca. 260 V are applied to each macroscopic structure in the reactor system of the invention in order to heat the structured catalyst and thus the gas passing through the structured catalyst, corresponding to a power deposited in the structured catalyst of 9899 kW.

The reactor system in the current configuration could have an overall internal diameter of the reactor system of 2.3 m and a total internal height of 3.2 m when the reactor system is made as a cylindrical reactor system with spherical heads. In this specific configuration, the macroscopic structures are placed in a square orientation having a diagonal length of 1.7 m. Inert material is placed around the structured catalyst to close the gap to the insulation material which has an internal diameter of 1.8 m and a thickness of 0.25 m.

During the passage of the feed gas through the reactor system, the feed gas is heated by the structured catalyst and undergoes steam reforming to a product gas having an exit temperature of 963° C. It is seen from Table 4 that the structured catalyst of Example 4 is somewhat smaller than the one used in Examples 1 and 3 due to the higher current. The total flows of the feed gas and the product gas correspond to the flows of Example 1.

TABLE 4

| | |
|---|---|
| Size of macroscopic structure: | |
| Edge size [m] | 0.24 |
| Height [m] | 0.9 |

TABLE 4-continued

| | |
|---|---|
| Number of macroscopic structures | 25 |
| Total volume of structured catalyst [L] | 1324 |
| Structured catalyst height/diagonal length [—] | 0.54 |

| | Feed gas | Product gas |
|---|---|---|
| T [° C.] | 500 | 963 |
| P [kg/cm² g] | 27.97 | 27.47 |
| CO2 [Nm³/h] | 168 | 727 |
| N2 [Nm³/h] | 26 | 26 |
| CH4 [Nm³/h] | 2630 | 164 |
| H2 [Nm³/h] | 590 | 8545 |
| CO [Nm³/h] | 1 | 1907 |
| H2O [Nm³/h] | 8046 | 5022 |
| Total flow [Nm³/h] | 11461 | 16391 |
| $\Delta T_{app,\ SMR}$ [° C.] | | 10 |

| | |
|---|---|
| Power [kW] | 9899 |
| Heat flux [kW/m²] | 9.0 |
| Space velocity [Nm³/m³/h] | 8653 |

Example 5

An example calculation of the process of the invention is given in Table 4 below. A feed gas is fed to the reactor system of the invention. The feed gas entering the reactor system is pressurized to a pressure of 182 bar and has a temperature of 500° C.

Inside the reactor system, a structured catalyst comprising nine macroscopic structures having a square cross section are placed in an array and each macroscopic structure has a size of 0.53 times 0.53 times 2.3 meter. Each macroscopic structure additionally has 17778 channels with a square cross section having a side or edge length of 0.32 cm. Each macroscopic structure has slits parallel to the longitudinal direction thereof, so that clusters of 5 times 5 channels are formed. The clusters are individually insulated from the neighboring cluster, except from the ends, so that the current path through the macroscopic structure has a zigzag path. A current of 200 A and a voltage of ca. 5.5 kV are applied to each macroscopic structure in the reactor system of the invention in order to heat the structured catalyst and thus the gas passing through the structured catalyst, corresponding to a power deposited in the structured catalyst of 9899 kW.

The reactor system in the current configuration could have an overall internal diameter of the reactor system of 3.2 m and a total internal height of 5.5 m when the reactor system is made as a cylindrical reactor system with spherical heads. In this specific configuration, the macroscopic structures are placed in a square orientation having a diagonal length of 2.3 m. Inert material is placed around the structured catalyst to close the gap to the insulation material which has an internal diameter of 2.5 m and a thickness of 0.35 m.

During the passage of the feed gas through the reactor system, the feed gas is heated by the structured catalyst and undergoes steam reforming to a product gas having an exit temperature of 1236° C. The total flows of the feed gas and the product gas are lower than the total flows of the gasses in Examples 1 and 4.

Since the product gas exiting the reactor system is already pressurized to a pressure of 181 bar, it is suited for being input into e.g. a hydrotreater of a refinery plant without further pressurizing. Thus, no compressors will be needed between the reactor system and the hydrotreater of the refinery plant. This reduces the overall cost of the plant with a reactor system of the invention.

TABLE 5

| Size of macroscopic structure: | |
|---|---|
| Edge size [m] | 0.53 |
| Height [m] | 2.3 |
| Number of macroscopic structures | 9 |
| Total volume of structured catalyst [L] | 5888 |
| Structured catalyst height/diagonal length [—] | 1.01 |

| | Feed gas | Product gas |
|---|---|---|
| T [° C.] | 500 | 1236 |
| P [kg/cm² g] | 181.97 | 181.47 |
| CO2 [Nm³/h] | 86 | 395 |
| N2 [Nm³/h] | 21 | 21 |
| CH4 [Nm³/h] | 2116 | 96 |
| H2 [Nm³/h] | 278 | 6648 |
| CO [Nm³/h] | 0 | 1711 |
| H2O [Nm³/h] | 6425 | 4096 |
| Total flow [Nm³/h] | 8926 | 12967 |
| $\Delta T_{app,\ SMR}$ [° C.] | | 10 |
| Power [kW] | | 9899 |
| Heat flux [kW/m²] | | 2.2 |
| Space velocity [Nm³/m³/h] | | 1516 |

Example 6

Example 6 relates to a reactor system comprising a structured catalyst in the form of a structured catalyst having in total 78540 channels with a total wall length of one channel in the cross section of 0.00628 m each and a length of 2 m, giving a total surface area of 987 m² of catalyst surface. For a reactor system with this structured catalyst, a simulation with varying gas flow through the structured catalyst was made where the gas composition in all calculations was 8.8% $H_2$, 56.8% $H_2O$, 0.2% $N_2$, 0.1% CO, 2.3% $CO_2$, and 31.8% $CH_4$. In each simulation a kinetic model for steam reforming and water gas shift was used and a variation in the surface flux (Q) of energy from the electrically heated structured catalyst was made to adjust the exit temperature of the product gas from the reactor system housing the structured catalyst to 920° C. The kinetic model used was similar to the approach used by Xu and Froment, (J. Xu and G. F. Froment, Methane steam reforming, methanation and water-gas shift: I. intrinsic kinetics. American Institution of Chemical Engineers Journal, 35:88-96, 1989.). FIG. 14 shows the approach to equilibrium along the reactor system length at varying total flows. The Figure shows that at low feed flows (10000 Nm³/h), the approach to the equilibrium at the outlet the reactor system is below 5° C., which translate into a hydrocarbon conversion of 77%, while at the high flows (150000 Nm³/h) the approach to equilibrium is above 60° C., which correspond to a hydrocarbon conversion of only 64%, and the hydrocarbons therefore are used less efficiently. The close control of the heat flux in the current invention therefore allows for controlling the approach to equilibrium closely along the length of the reactor system. A general trend in all the curves in FIG. 14 is that the approach to equilibrium is continuously decreasing until a pseudo equilibrium is reached, where the heat added and the heat consumed roughly equal each other.

The approach to equilibrium from this stage is substantially constant or has a slightly increasing development due to the overall increasing temperature of the reactor system.

Example 7 (Comparative Example)

An SMR with a number of identical tubes is provided. Each tube has an internal diameter of 10 cm and a length of 13 m. The total heat flux to the SMR tubes is adjusted to an average heat flux (based on the surface area of the inner surface of the tubes) of 90,000 kcal/h/m² corresponding to ca. 105 kW/m². Each tube is loaded with catalyst pellets. The dimensions of the catalyst pellets are adjusted to give a void fraction of 60%. Such a configuration allows for processing around 410 Nm³/h of process gas per tube in the SMR, when the feed gas has a composition of 8.8% hydrogen, 56.8% water, 0.2% nitrogen, 0.1% carbon monoxide, 2.3% carbon dioxide, and 31.8% methane.

This gives:

Total internal tube volume (volume limited by the interior surface of the tube and the height of the tube): 0.1021 m³

Internal tube volume occupied by catalyst material: 0.0408 m³

Total amount of internal tube volume occupied by catalyst material per unit of internal reactor system volume: 0.4 m³/m³

Total amount of energy supplied to the tube interior: 427.4 kW

Amount of energy supplied to the tube interior per unit of tube interior volume: 4186 kW/m³.

Gas processed per reactor catalyst volume: 4015 Nm³/m³/h.

Example 8

A reactor system according to the invention is provided. A structured catalyst with a geometric surface area of 800 m²/m³ is provided. 95% of the area is covered with a ceramic coating with catalytically active material. The ceramic coating has a thickness of 0.1 mm. A power of 9 kW/m² of surface area of the structured catalyst is applied. Such a reactor can process ca. 7700 Nm³/m³/h relative to the volume of the structured catalyst, when the feed gas has a composition of 8.8% hydrogen, 56.8% water, 0.2% nitrogen, 0.1% carbon monoxide, 2.3% carbon dioxide, and 31.8% methane.

This gives:

Amount of energy supplied to the structured catalyst per unit of structured catalyst volume: 7200 kW/m³.

Total amount of internal reactor system volume occupied by catalyst per unit of internal reactor system volume: 0.076 m³/m³.

Gas processed per reactor catalyst volume: 101315 Nm³/m³/h

It is seen by comparing with Example 7, that the internal reactor system volume can be made much more compact. In addition, in the reactor system according to the invention, no furnace is needed thus substantially reducing the reactor size.

Furthermore, the amount of catalytically active material is reduced considerably compared to the state of the art.

The invention claimed is:

1. A reactor system for carrying out steam reforming of a feed gas comprising hydrocarbons, said reactor system comprising:
   a structured catalyst arranged for catalyzing steam reforming of said feed gas comprising hydrocarbons, said structured catalyst comprising a macroscopic structure of electrically conductive material, said macroscopic structure supporting a ceramic coating, wherein said ceramic coating supports a catalytically active material;
   a pressure shell housing said structured catalyst, said pressure shell comprising an inlet for letting in said feed gas and an outlet for letting out product gas, wherein said inlet is positioned so that said feed gas enters said structured catalyst in a first end of said structured catalyst and said product gas exits said structured catalyst from a second end of said structured catalyst;

a heat insulation layer between said structured catalyst and said pressure shell; and at least two conductors electrically connected to said structured catalyst and to an electrical power supply placed outside said pressure shell, wherein said electrical power supply is dimensioned to heat at least part of said structured catalyst to a temperature of at least 500° C. by passing an electrical current through said macroscopic structure, wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor to the second end of the structured catalyst and return to a second of said at least two conductors.

2. A reactor system according to claim 1, wherein the pressure shell has a design pressure of between 5 and 30 bar.

3. A reactor system according to claim 1, wherein the pressure shell has a design pressure of between 30 and 200 bar.

4. A reactor system according to claim 1, wherein the resistivity of the macroscopic structure is between $10^{-5}$ Ω·m and $10^{-7}$ Ω·m.

5. A reactor system according to claim 1, where each of the at least two conductors are led through the pressure shell in a fitting so that the at least two conductors are electrically insulated from the pressure shell.

6. A reactor system according to claim 5, wherein said pressure shell further comprises one or more inlets close to or in combination with at least one fitting in order to allow a cooling gas to flow over, around, close to, or inside at least one conductor within said pressure shell.

7. A reactor system according to claim 1, wherein the reactor system further comprises an inner tube in heat exchange relationship with but electrically insulated from the structured catalyst, said inner tube being adapted to withdraw a product gas from the structured catalyst so that the product gas flowing through the inner tube is in heat exchange relationship with gas flowing through the structured catalyst.

8. A reactor system according to claim 1, wherein the connection between the structured catalyst and said at least two conductors is a mechanical connection, a welded connection, a brazed connection or a combination thereof.

9. A reactor system according to claim 1, wherein the macroscopic structure is an extruded and sintered structure or a 3D printed and sintered structure.

10. A reactor system according to claim 1, wherein the structured catalyst comprises an array of macroscopic structures electrically connected to each other.

11. A reactor system according to claim 1, wherein said structured catalyst has electrically insulating parts arranged to increase the length of a principal current path between said at least two conductors to a length larger than the largest dimension of the structured catalyst.

12. A reactor system according to claim 1, wherein said structured catalyst has at least one electrically insulating part arranged to direct a current through said structured catalyst in order to ensure that for at least 70% of the length of said structured catalyst, a current density vector of the principal current path has a non-zero component value parallel to the length of said structured catalyst.

13. A reactor system according to claim 1, wherein said macroscopic structure has a plurality of parallel channels, a plurality of non-parallel channels and/or a plurality of labyrinthic channels.

14. A reactor system according to claim 1, wherein the reactor system further comprises a bed of a second catalyst material upstream said structured catalyst within said pressure shell.

15. A reactor system according to claim 12, wherein said reactor system further comprises a third catalyst material in the form of catalyst pellets, extrudates or granulates loaded into the channels of said structured catalyst.

16. A reactor system according to claim 1, further comprising a bed of fourth catalyst material placed within the pressure shell and downstream the structured catalyst.

17. A reactor system according to claim 1, wherein the material of the macroscopic structure is chosen as a material arranged to generate a heat flux of 500 to 50000 W/m² by resistance heating of the material.

18. A reactor system according to claim 1, wherein the structured catalyst comprises a first part arranged to generate a first heat flux and a second part arranged to generate a second heat flux, where the first heat flux is lower than the second heat flux, and where the first part is upstream the second part.

19. A reactor system according to claim 1, wherein said reactor system further comprises a control system arranged to control the electrical power supply to ensure that the temperature of the gas exiting the pressure shell lies in a predetermined range and/or to ensure that the conversion of hydrocarbons in the feed gas lies in a predetermined range and/or to ensure the dry mole concentration of methane lies in a predetermined range and/or to ensure the approach to equilibrium of the steam reforming reaction lies in a predetermined range.

20. A reactor system according to claim 1, wherein the structured catalyst within said reactor system has a ratio between the area equivalent diameter of a horizontal cross section through the structured catalyst and the height of the structured catalyst in the range from 0.1 to 2.0.

21. A reactor system according to claim 1, wherein the height of the reactor system is between 0.5 and 7 m.

22. A process for carrying out steam reforming of a feed gas comprising hydrocarbons in a reactor system comprising a pressure shell housing a structured catalyst arranged to catalyze steam reforming of a feed gas comprising hydrocarbons, said structured catalyst comprising a macroscopic structure of an electrically conductive material, said macroscopic structure supporting a ceramic coating, where said ceramic coating supports a catalytically active material and wherein said reactor system is provided with heat insulation between said structured catalyst and said pressure shell; said process comprising the following steps:

pressurizing a feed gas comprising hydrocarbons to a pressure of at least 5 bar, supplying said pressurized feed gas to said pressure shell through an inlet positioned so that said feed gas enters said structured catalyst in a first end of said structured catalyst;

allowing the feed gas to undergo steam reforming reaction over the structured catalyst and outletting a product gas from said pressure shell, wherein said product gas exits said structured catalyst from a second end of said structured catalyst;

supplying electrical power via electrical conductors connecting an electrical power supply placed outside said pressure shell to said structured catalyst, allowing an electrical current to run through said macroscopic structure, thereby heating at least part of the structured catalyst to a temperature of at least 500° C., wherein said at least two conductors are connected to the structured catalyst at a position on the structured catalyst closer to said first end of said structured catalyst than to said second end of said structured catalyst, and wherein the structured catalyst is constructed to direct an electrical current to run from one conductor to the second end of the structured catalyst and return to a second of said at least two conductors.

23. A process according to claim 22, further comprising the step of pressurizing the feed gas upstream the pressure shell to a pressure of between 5 and 30 bar.

24. A process according to claim 22, further comprising the step of pressurizing said feed gas upstream said pressure shell to a pressure of between 30 and 200 bar.

25. A process according to claim 22, wherein the temperature of the feed gas let into the reactor system is between 200° C. and 700° C.

26. A process according to claim 22, wherein the macroscopic structure is heated to obtain a maximum temperature of the macroscopic structure between 500° C. and 1300° C.

27. A process according to claim 22, further comprising the step of inletting a cooling gas through an inlet through the pressure shell close to or in combination with at least one fitting in order to allow a cooling gas to flow over, around, close to, or inside at least one conductor within said pressure shell.

28. A process according to claim 22, wherein the space velocity evaluated as flow of gas relative to the geometric surface area of the structured catalyst is between 0.6 and 60 $Nm^3/m^3/h$ or between 700 $Nm^3/m^3/h$ and 70000 $Nm^3/m^3/h$ when evaluated as flow of gas relative to the occupied volume of the structured catalyst.

* * * * *